(12) United States Patent
Utsunomiya et al.

(10) Patent No.: US 7,903,607 B2
(45) Date of Patent: Mar. 8, 2011

(54) WIRELESS COMMUNICATION APPARATUS

(75) Inventors: Yoriko Utsunomiya, Tokyo (JP);
Tomoko Adachi, Urayasu (JP);
Masahiro Takagi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 778 days.

(21) Appl. No.: 11/857,841

(22) Filed: Sep. 19, 2007

(65) Prior Publication Data
US 2008/0151849 A1 Jun. 26, 2008

(30) Foreign Application Priority Data

Dec. 26, 2006 (JP) ................................ 2006-350337

(51) Int. Cl.
H04W 74/02 (2009.01)
H04W 74/08 (2009.01)
H04W 72/04 (2009.01)
H04W 72/02 (2009.01)
H04J 3/16 (2006.01)

(52) U.S. Cl. ......... 370/329; 370/232; 370/235; 370/252; 370/255; 370/348; 370/445; 455/453; 455/454

(58) Field of Classification Search .................. 370/229, 370/230, 230.1, 232, 235, 252, 254, 255, 370/310, 328, 329, 346, 348, 445, 477; 455/450, 455/452.1, 452.2, 453, 454
See application file for complete search history.

(56) References Cited

U.S. PATENT DOCUMENTS

| 7,236,782 B2 | 6/2007 | Utsunomiya et al. | |
| 7,493,123 B2 * | 2/2009 | Cave et al. | 455/453 |
| 2005/0208956 A1 | 9/2005 | Takagi et al. | |
| 2006/0013184 A1 | 1/2006 | Utsunomiya et al. | |
| 2006/0045059 A1 * | 3/2006 | Yun et al. | 370/338 |
| 2006/0114928 A1 | 6/2006 | Utsunomiya et al. | |
| 2006/0146869 A1 * | 7/2006 | Zhang et al. | 370/465 |
| 2006/0159003 A1 * | 7/2006 | Nanda et al. | 370/203 |
| 2006/0242457 A1 * | 10/2006 | Roy et al. | 714/12 |
| 2006/0286935 A1 | 12/2006 | Utsunomiya et al. | |
| 2007/0060159 A1 | 3/2007 | Utsunomiya et al. | |
| 2007/0133473 A1 | 6/2007 | Takagi et al. | |
| 2007/0248104 A1 * | 10/2007 | Rudolf et al. | 370/400 |
| 2007/0280180 A1 * | 12/2007 | Dalmases et al. | 370/338 |

(Continued)

FOREIGN PATENT DOCUMENTS

JP 2004-242893 9/2004

OTHER PUBLICATIONS

Yoriko Utsunomiya, et al., IEEE802.11n, "20/40 Mhz Terminals Coexistence System for Implementation of High-speed Wireless LAN", Collection of Articles of Institute of Electronics, Information and Communication Engineers, Feb. 1, 2006, vol. J89-B, pp. 153-170.

(Continued)

*Primary Examiner* — Chi H Pham
*Assistant Examiner* — Ahmed Elallam
(74) *Attorney, Agent, or Firm* — Oblon, Spivak, McClelland, Maier & Neustadt, L.L.P.

(57) ABSTRACT

There is disclosed a wireless communication apparatus in which a first wireless communication using one first channel of two first channels each having a first bandwidth, and a second wireless communication using a second channel having a second bandwidth wider than the first bandwidth and having a band overlapping those of the two first channels are performed. A selection unit selects a Basic Service Set (BSS) operational mode on the basis of a load amount of the other first channel of the two first channels. A generation unit generates a management frame indicating the BSS operational mode selected by the BSS mode selection unit. A transmission unit transmits the management frame.

10 Claims, 16 Drawing Sheets

U.S. PATENT DOCUMENTS

2008/0013496 A1* 1/2008 Dalmases et al. ............ 370/336
2008/0049773 A1* 2/2008 Utsunomiya et al. ......... 370/412
2009/0067403 A1* 3/2009 Chan et al. .................... 370/343
2009/0285116 A1* 11/2009 Nanda et al. ................. 370/252

OTHER PUBLICATIONS

U.S. Appl. No. 12/027,606, filed Feb. 7, 2008, Utsunomiya, et al.

EWC, "HT MAC Specification", <URL: http://www.Enhancedwirelessconsortium.org/>, Version V1.24, Jan. 5, 2006, 50 Pages.

Yoriko Utsunomiya, et al., "A MAC Protocol for Coexistence between 20/40 MHz STAs for High Throughput WLAN", VTC 2006 Spring (IEEE Vehicular Technology Conference), May 2006, 5 pages.

* cited by examiner

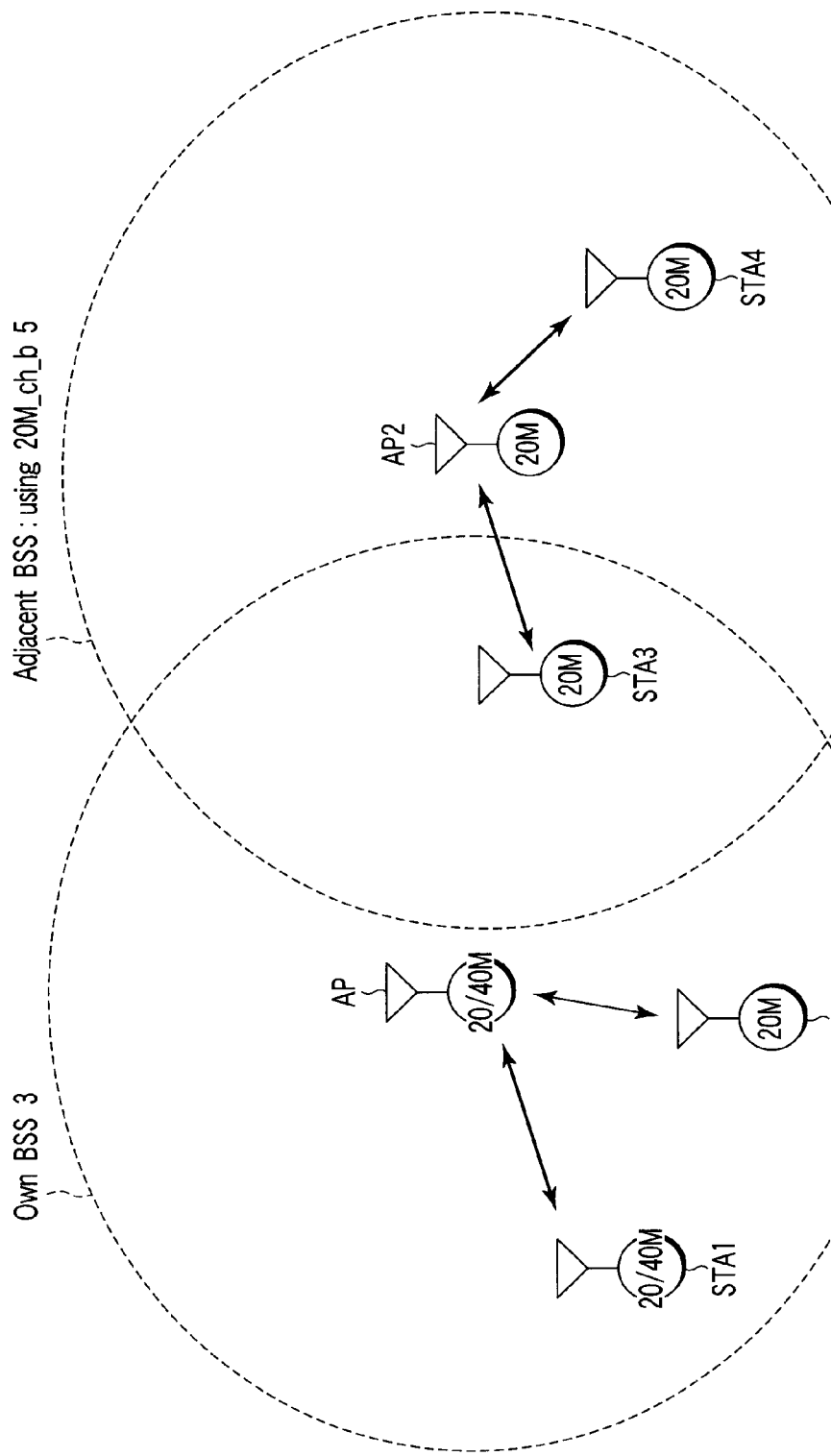
F I G. 5

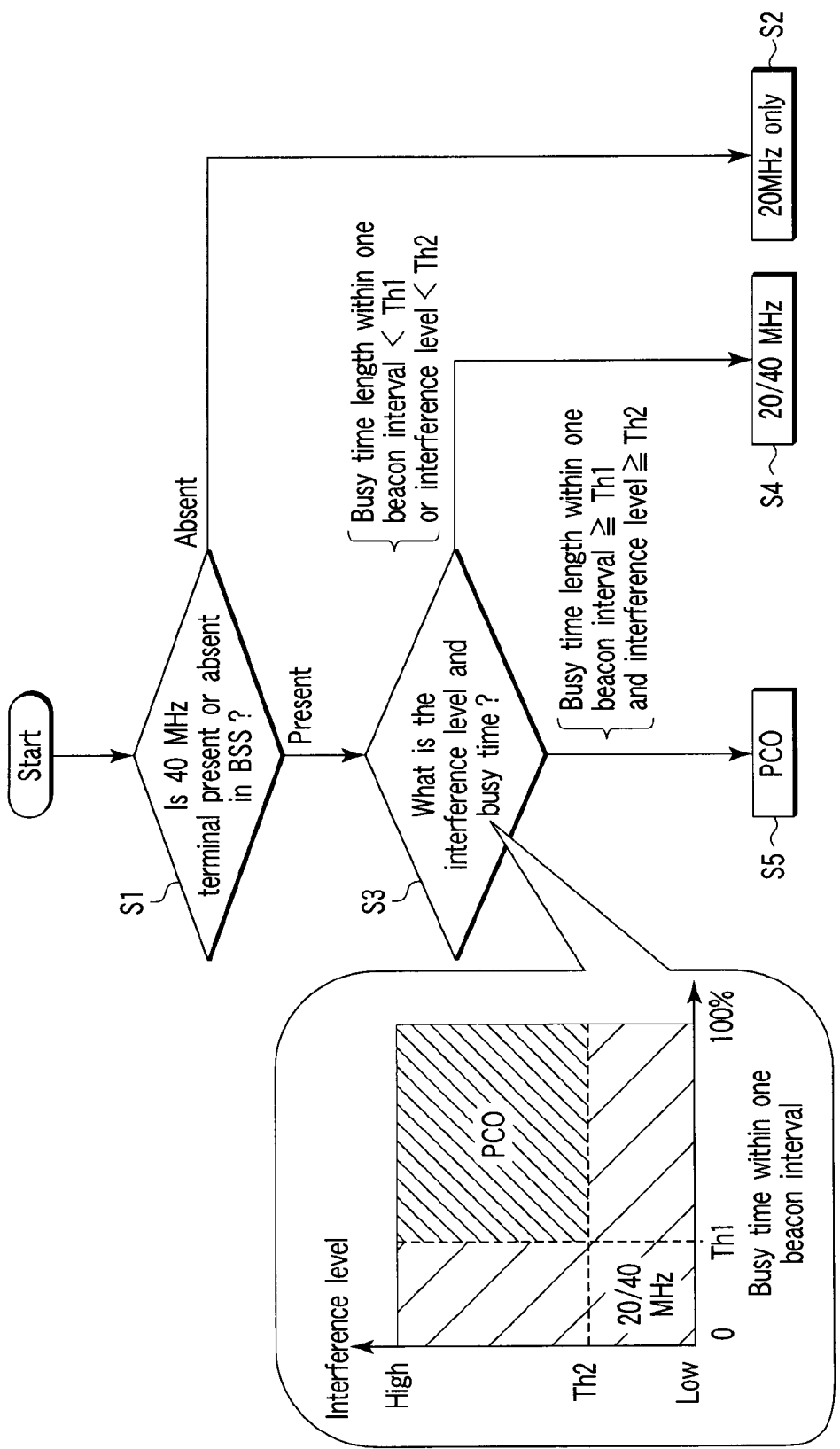
F I G. 7

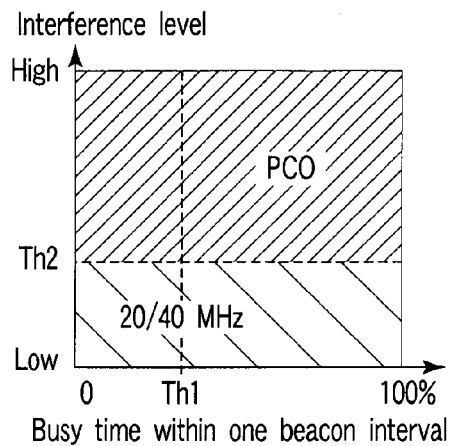
F I G. 8A
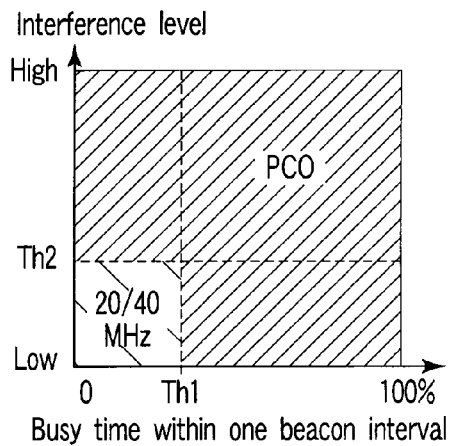
F I G. 8B
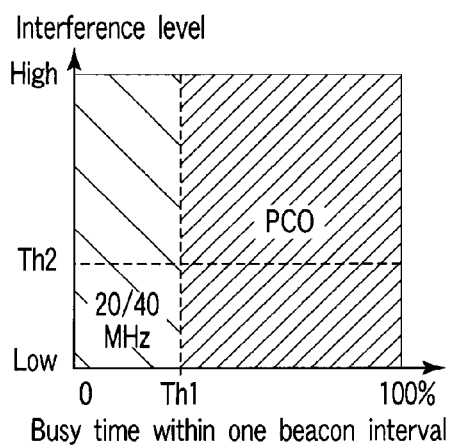
F I G. 8C
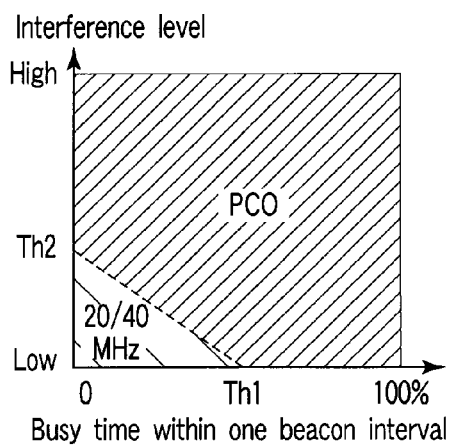
F I G. 8D
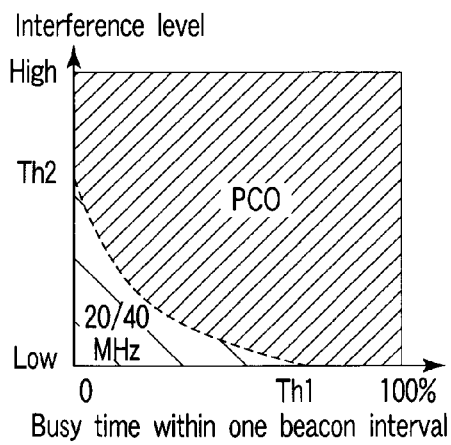
F I G. 9A
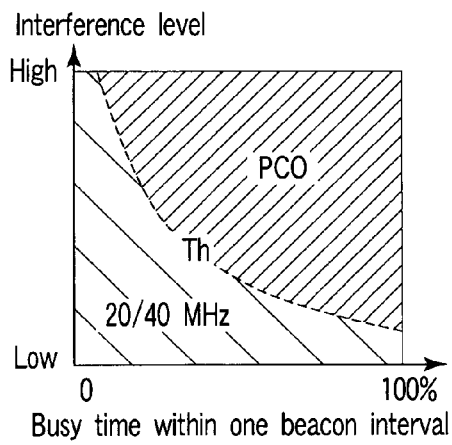
F I G. 9B

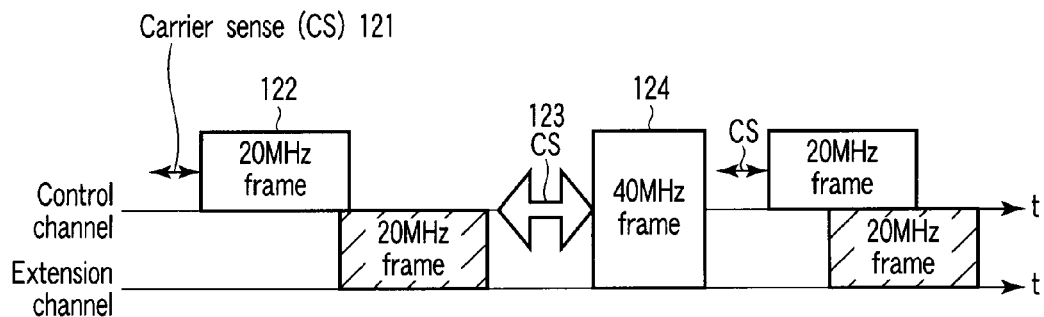
F I G. 12
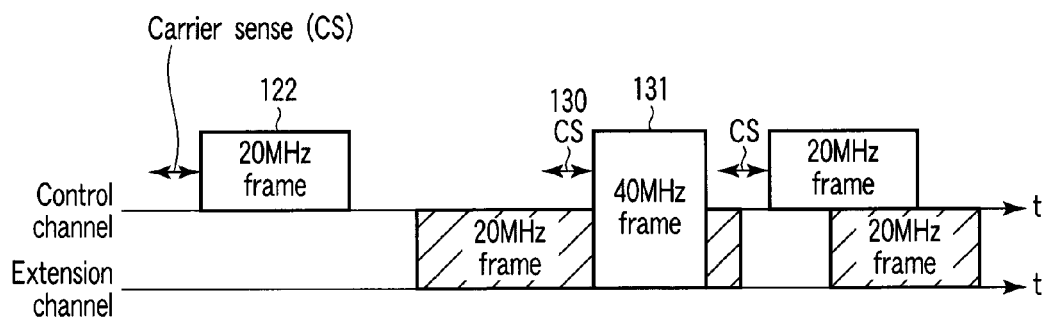
F I G. 13

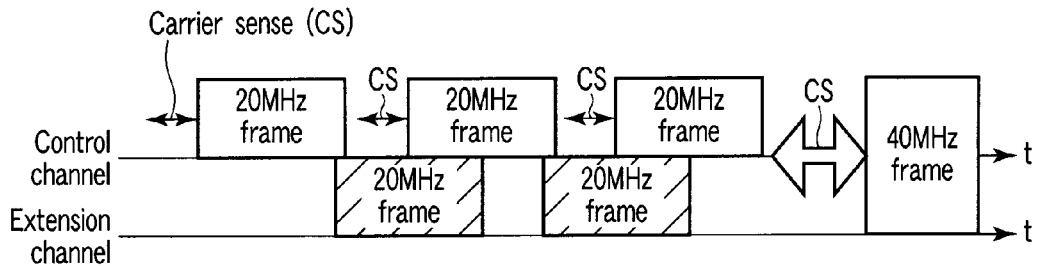
F I G. 14A
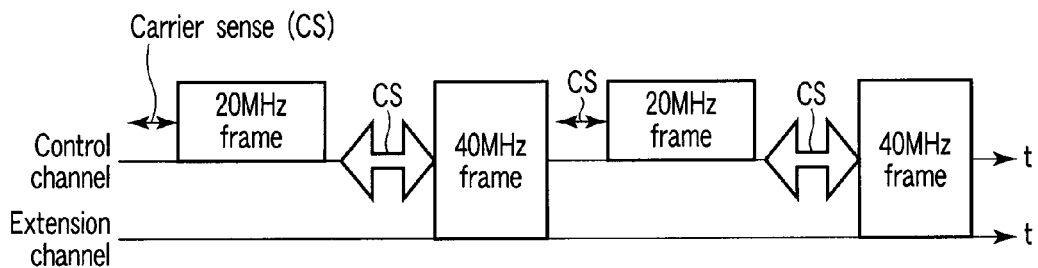
F I G. 14B
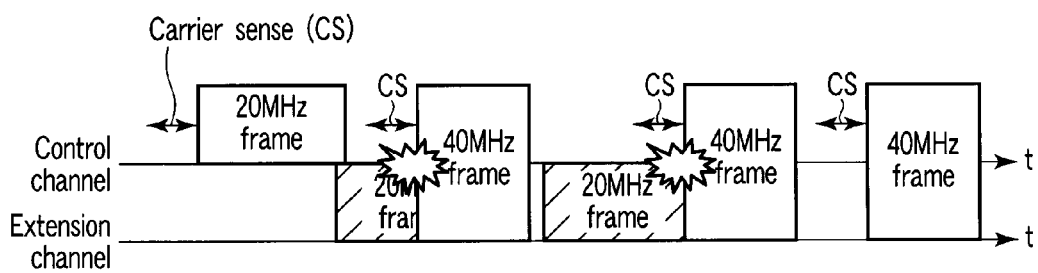
F I G. 15A
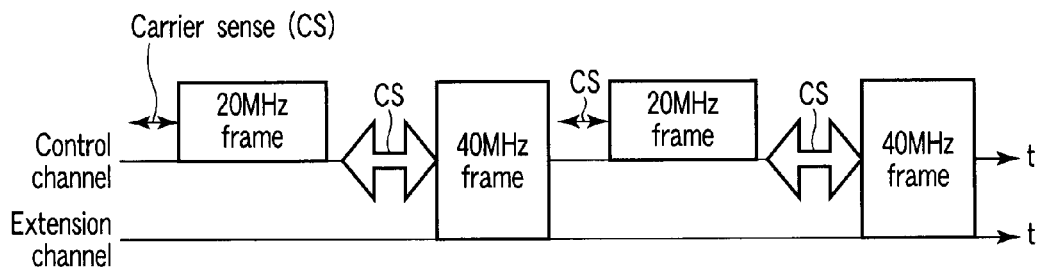
F I G. 15B

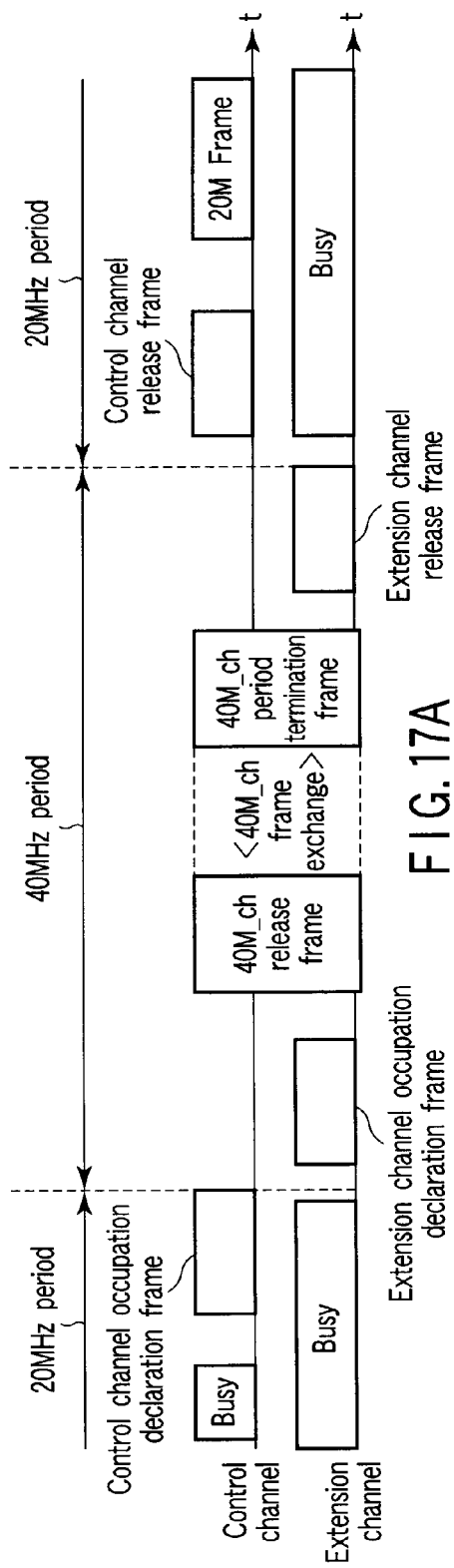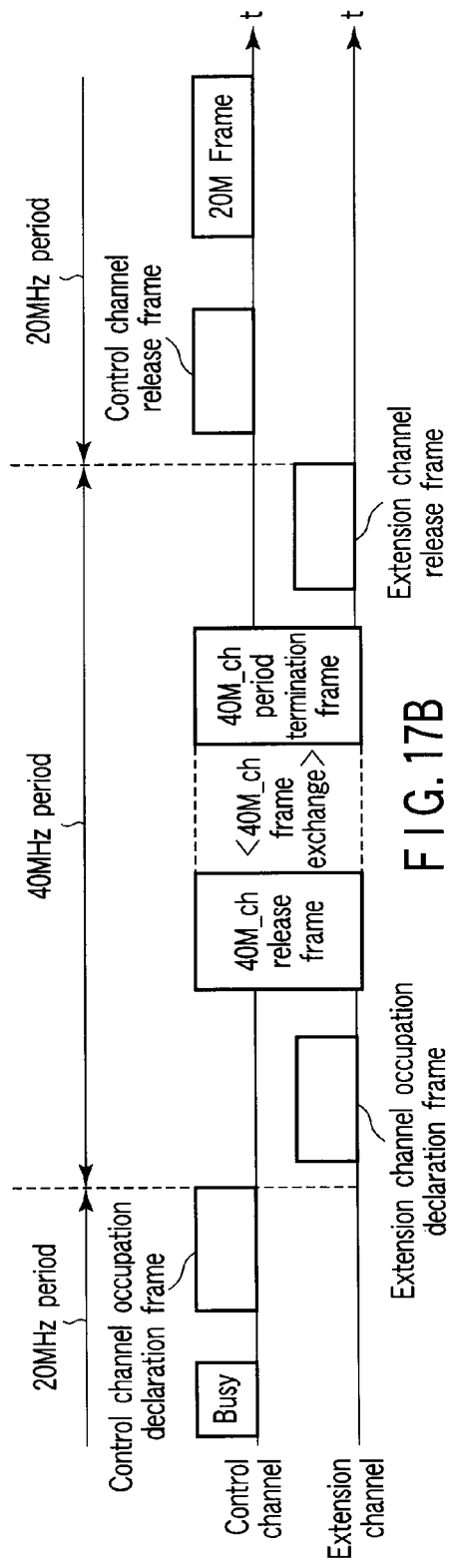

WIRELESS COMMUNICATION APPARATUS

CROSS-REFERENCE TO RELATED APPLICATIONS

This application is based upon and claims the benefit of priority from prior Japanese Patent Application No. 2006-350337, filed Dec. 26, 2006, the entire contents of which are incorporated herein by reference.

BACKGROUND OF THE INVENTION

1. Field of the Invention

The present invention relates to a wireless communication apparatus for performing media access control on the basis of a carrier sense state.

2. Description of the Related Art

In recent years, wireless LANs (local area network) have become widespread in offices, homes, and as hot spot services in public places. In the mainstream as wireless LAN standards are those such as IEEE802.11a using the 5 GHz band and IEEE802.11b/g using the 2.4 GHz band. However, IEEE802.11e, in which QoS (quality of service) function is extended to MAC (medium access control) layer on IEEE802.11a/b/g, is also established as a standard. Further, at present, the standardization activity of IEEE802.11n extending both the physical layer and the MAC layer with a goal of achieving effective throughput equal to or larger than 100 Mbps is also advanced.

As for IEEE802.11n, as one approach to realization of speed-enhancement of the transmission rate, a method of extending the communication band is proposed. Conventionally, the bandwidth of one channel used in the IEEE802.11 wireless LAN is 20 MHz. In the method, two channels of this bandwidth are simultaneously used, thereby to realize 40 MHz band communication having a twofold bandwidth. It also becomes necessary concomitantly to perform media access control while targeting different channels coexisting in the same frequency at the time of extending the communication band. In IEEE802.11n, considered are both a media access control system, in which a centralized control station reserves a plurality of frequency channels one by one in sequence as described in Jpn. Pat. Appln. KOKAI Publication No. 2004-242893, and a system in which each terminal as described in EWC MAC Specification Version V1.0 Sep. 12, 2005, Internet <URL: http://www.enhancedwirelessconsortium.org/> performs CSMA/CA similar to IEE802.11 in an autonomous and distributed manner, thereby making media access. The former, i.e., the media access control system in which a centralized control station reserves a plurality of frequency channels one by one in sequence is called a phased coexistence operation (PCO) mode, and is a system in which a period of narrowband communication (20 MHz) using a single channel and a period of broadband communication (40 MHz) using a plurality of channels are time-shared. On the other hand, the latter, i.e., the system in which each terminal performs CSMA/CA similar to IEE802.11 in an autonomous and distributed manner, thereby making media access, is called a 20/40 MHz mode, in which switching of communication in units of one frame between a narrowband (20 MHz) frame using a single channel and a broadband (40 MHz) frame using a plurality of channels is permitted.

As described above, the PCO mode, 20/40 MHz mode, and 20 MHz only mode in which only narrowband (20 MHz) communication using a single channel as in conventional IEEE802.11 is performed exist as operational modes of BSS in IEEE802.11n. The BSS operational mode is selected by the centralized control station and this fact is notified to terminals in the BSS. In this case, there is a technical problem that if the centralized control station does not appropriately select the BSS operational mode, lowering of the throughput of the BSS is brought about.

For example, when a 40 MHz terminal is present in the BSS, if the 20 MHz only mode is selected as the BSS operational mode, the terminal can perform only communication using the 20 MHz band though the terminal has the 40 MHz communication capability, and low throughput is caused. On the other hand, when only a 20 MHz terminal is present in the BSS, if the PCO mode is selected as the BSS operational mode, a 40 MHz period is set though a terminal for transmitting in the 40 MHz band is not present, and switching between 20 MHz and 40 MHz is also caused, thereby wasting time and deteriorating the throughput.

BRIEF SUMMARY OF THE INVENTION

As described above, if the centralized control station does not appropriately select the operational BSS mode in accordance with the environment in the BSS and the state of the channel to be used or the like, the effect of band extension introduced into IEEE802.11n with the aim of speed-enhancement of the transmission rate is not sufficiently obtained, and contrarily there is even the possibility of the throughput being deteriorated.

A wireless communication apparatus according to an aspect of the present invention is a wireless communication apparatus in which first wireless communication using one first channel of two first channels each having a first bandwidth, and second wireless communication using a second channel having a second bandwidth wider than the first bandwidth and having a band overlapping those of the two first channels are performed, and comprises: a selection unit configured to select a Basic Service Set (BSS) operational mode on the basis of a load amount of the other first channel of the two first channels; a generation unit configured to generate a management frame indicating the BSS operational mode selected by the BSS mode selection unit; and a transmission unit configured to transmit the management frame.

BRIEF DESCRIPTION OF THE SEVERAL VIEWS OF THE DRAWING

FIG. 5 is a view showing another wireless communication system according to the first embodiment.

FIG. 7 is a flowchart for explaining a selection algorithm in a BSS mode selection section according to the first embodiment.

FIGS. 8A to 8D show views for explaining another selection algorithm in the BSS mode selection section according to the first embodiment.

FIGS. 9A and 9B show views for explaining another example of a selection algorithm in the BSS mode selection section according to the first embodiment.

FIG. 12 is a view for explaining media access control in the 20/40 MHz mode.

FIG. 13 is a view for explaining another type of media access control in the 20/40 MHz mode.

FIGS. 14A and 14B show views for explaining a difference in the load of an extension channel in the media access control of FIGS. 8 and 9.

FIGS. 15A and 15B show views for explaining a difference in the load of an extension channel in the media access control of FIG. 10.

FIGS. 17A and 17B show views for explaining a difference in the load of an extension channel in the PCO mode.

DETAILED DESCRIPTION OF THE INVENTION

Figures 1, 2:
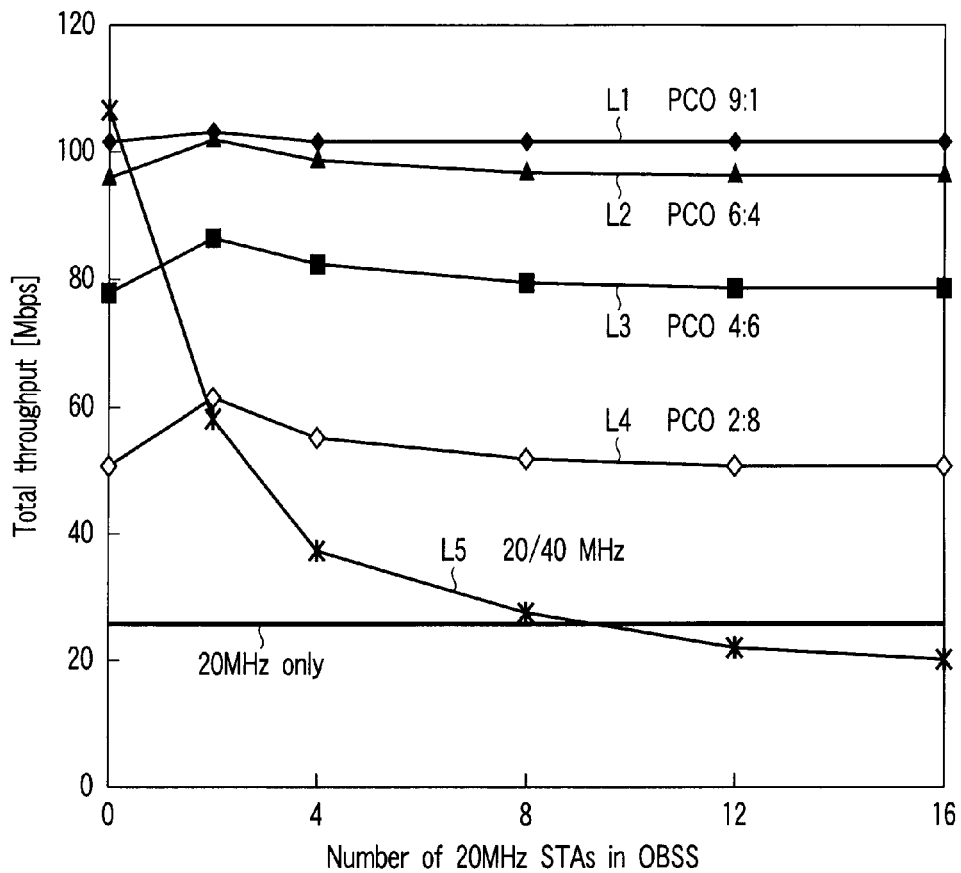
FIG. 1 is a view showing the throughput characteristics of a wireless communication system according to an embodiment.
FIG. 2 is a view showing throughput characteristics of each mode of the wireless communication system according to the embodiment.

Embodiments of the invention will be described below with reference to the accompanying drawings.

A wireless LAN system based on IEEE Std. 802.11-1999 (revision 2003 includes ISO/IEC 8802-11:1999(E) ANSI/IEEE Std 802.11, 1999 edition, IEEE Std 802.11a-1999, IEEE Std 802.11b-1999, IEEE Std 802.11b-1999/Cor 1-2001, and IEEE Std 802.11d-2001) will be explained below as an example of a system in which terminals perform frame transmission by centralized control. In the following, a basic system configuration will be described on the basis of an IEEE 802.11 wireless LAN.

The IEEE 802.11 standard is a standard associated with the physical (PHY) layer and medium access control (MAC) layer. In the following processing, description will be given by paying attention to processing mainly in the MAC layer.

Incidentally, the IEEE 802.11 standard to be described herein includes standards regarded as an amendment to or recommended practice of the IEEE 802.11 standard.

According to "IEEE802.11n Working Group, "Draft Amendment to STANDARD [FOR] Information Technology—Telecommunications and information exchange between systems—Local and Metropolitan networks—Specific requirements—Part 11: Wireless LAN Medium Access Control and Physical Layer specifications: Enhancements for Higher Throughput," IEEE P802.11nTM/D1.0, January 2006.", in IEEE802.11n, 40 MHz communication is realized by using two adjacent channels each having a 20 MHz bandwidth together. Of the two channels, one is called a control channel, and is used for 20 MHz communication and exchanging control information for BSS management. The other channel is called an extension channel, and is used as a channel for extending the band at the time of 40 MHz communication. The extension channel is sometimes used in equipment or apparatuses that particularly only use a 20 MHz band, such as those according to IEEE802.11/a/b/g.

With respect to the technical object of appropriately selecting the BSS operational mode, the present inventors have performed various investigations, as shown in "Yoriko Utsunomiya, Tomoya Tandai, Tomoko Adachi, and Masahiro Takagi, "20/40 MHz terminal coexistence system aimed at realization of IEEE802.11n high-speed wireless LAN", ITE research paper B, vol. J89-B, no. 2, February 2006." and "Yoriko Utsunomiya, Tomoya Tandai, Tomoko Adachi and Masahiro Takagi, "A MAC Protocol for Coexistence between 20/40 MHz STAs for High Throughput WLAN", VTC 2006 spring (Vehicular Technology Conference), May 2006.". As a result, it has been found that in effectively selecting the BSS operational mode and switching thereto, a load amount of the extension channel resulting from some other system and some other BSS is an important parameter. The load amount of the extension channel can be roughly grasped on the basis of the number of terminals or traffic volume of the other BSS presently using the extension channel, and a length of time of receiving an interference signal from the other BSS in the extension channel or the interference signal intensity.

The throughput characteristics in the 20 MHz only mode, PCO mode, and 20/40 MHz mode associated with the number of terminals of the other BSS presently using the extension channel are shown in FIG. 1 as an example. It can be seen from FIG. 1 that in the PCO modes (L1 to L4), high throughput can be achieved irrespective of presence and absence of the other BSS presently using the extension channel, while higher throughput can be achieved in the 20/40 MHz mode (L5) when the other BSS is absent on the extension channel.

Further, the 20 MHz only mode and 20/40 MHz mode are superior to the PCO mode in the simplicity of control and absence of overhead of switching between 20 MHz and 40 MHz. Accordingly, when the load amount of the extension channel is small and the same characteristic as in the PCO mode can be achieved, the BSS operation (M1) in the 20 MHz only mode or the 20/40 MHz mode is desirable, and when the load amount of the extension channel becomes large and the characteristic of the 20/40 MHz mode is largely deteriorated, it is desirable that the 20 MHz only mode or the PCO mode (M2) be selected.

The configuration and operation of a wireless communication apparatus in which the appropriate BSS mode is selected on the basis of the load amount of the other system or BSS will be described below in the embodiments.

First Embodiment

Figure 3:
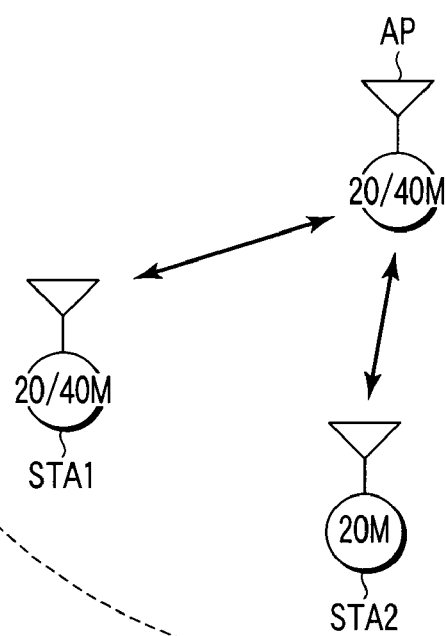
FIG. 3 is a view showing the wireless communication system according to a first embodiment.

FIG. 3 shows an example of a configuration of a wireless communication system according to this embodiment. In this example, two wireless terminals (STA1, STA2) are connected to one access point (AP), thereby constituting one Basic Service Set (BSS) 3. This BSS 3 is managed by the AP in a concentrated manner.

In the BSS 3, two types of channels different from each other in the frequency bandwidth are used to transmit or receive frames. That is, the two channels are a first channel having a first communication bandwidth, and a second channel having a second communication bandwidth wider than the first communication bandwidth. In this embodiment, the first communication bandwidth is 20 MHz, and the second communication bandwidth is 40 MHz.

The access point (AP) and STA1 in FIG. 3 are compatible with both the bandwidths of 20 MHz and 40 MHz, and are capable of performing transmission and reception using any one of 40M ch and 20M_ch_a. Both of 40M ch and 20M_ch_a may be used for data frame transmission/reception. Further, 40M ch and 20M_ch_a may be used in such a manner that data frame transmission/reception is performed by using 40M ch, and control information transmission/reception is performed by using 20M_ch_a. STA2 is a terminal compatible only with the bandwidth of 20 MHz, and performs only transmission/reception using 20M_ch_a. The number of wireless terminals to be connected to the access point or the number of terminals of each type is not limited to a specific number. For example, a BSS in which STA2 is not present and only 20/40 MHz terminals are present can be realized.

Figure 4A:
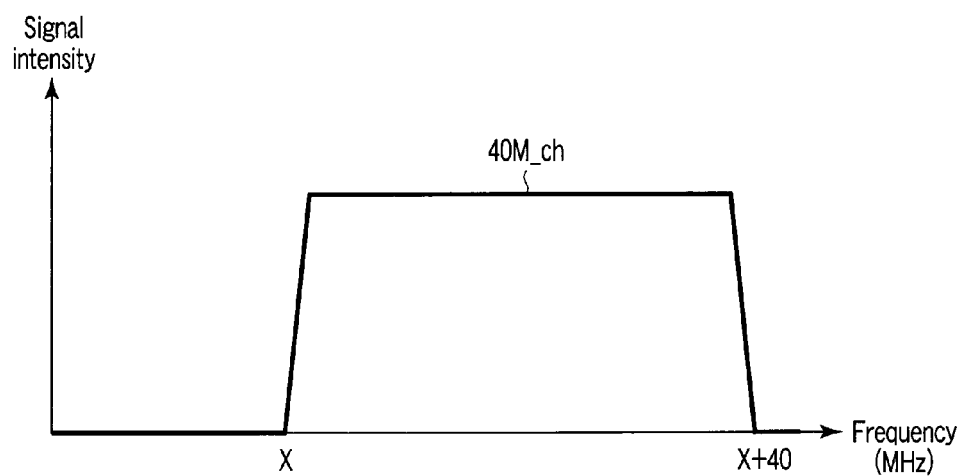
FIGS. 4A and 4B show schematic views of channels according to the first embodiment.
Figure 4B:
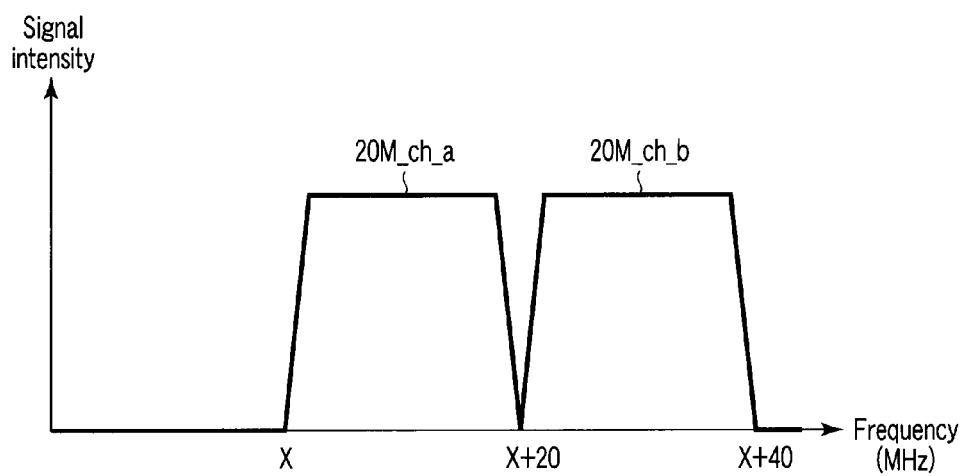

FIG. 4 shows a schematic view of a channel. There are the channel 20M_ch_a (FIG. 4B) of 20 MHz using a frequency band of X MHz to (X+20) MHz and the channel 40M_ch (FIG. 4A) of 40 MHz using a frequency band of X MHz to (X+40) MHz. Accordingly, the frequency band X MHz to (X+20) MHz is used by both the 20 MHz channel and the 40 MHz channel in an overlapping manner. The channel 20M_ch_a is called a "control channel" in the BSS, and is used to exchange control information used for 20 MHz communication and BSS management. Another 20 MHz channel 20M_ch_b using the frequency band of (X+20) MHz to (X+40) MHz forms the 40M_ch in cooperation with the 20M_ch_a. This 20M_ch_b is called an "extension channel" in the BSS. Although the channel 20M_ch_b is not used singly in the 20 MHz communication of the BSS of FIG. 3, the channel 20M_ch_b is used in the other system or in the other BSS5 in some cases. Particularly, it is sometimes used in a BSS using only the 20 MHz band, such as IEEE802.11/a/b/g.

FIG. 5 shows a state where two BSSs, 3 and 5, exist close to each other. In FIG. 5, the BSS 3 is the same BSS as that shown in FIG. 3, and the AP and STA1 are compatible with both the 20 MHz and 40 MHz bandwidths. In 20 MHz communication, the control channel is used, and in 40 MHz communication, both the control channel and the extension channel are used. STA2 is a terminal compatible with only the 20 MHz band, and performs only communication using the control channel. Likewise, in FIG. 5, the BSS 5 is constituted of an AP2, STA3, STA4 which are compatible with only the 20 MHz band, and performs 20 MHz communication using only the extension channel. Since the BSSs 3 and overlap each other on the extension channel, it is necessary for them to share the media.

In the BSS 3 shown in FIG. 5, in accordance with the coexistence system in which the BSS 3 and the BSS 5 existing close thereto, any one of the BSS operational modes, i.e., the 20 MHz only mode, 20/40 MHz mode, and PCO mode is selected by the AP, and media access control is performed by the AP. Each of them is a system based on CSMA/CA.

The AP selects one of the three types of BSS operational modes, and notifies the terminals in the BSS 3 of the selected operational mode by using the control information frame. The terminals in the BSS 3 each operate their own terminal apparatuses in accordance with the notified BSS operational mode.

Figure 6:
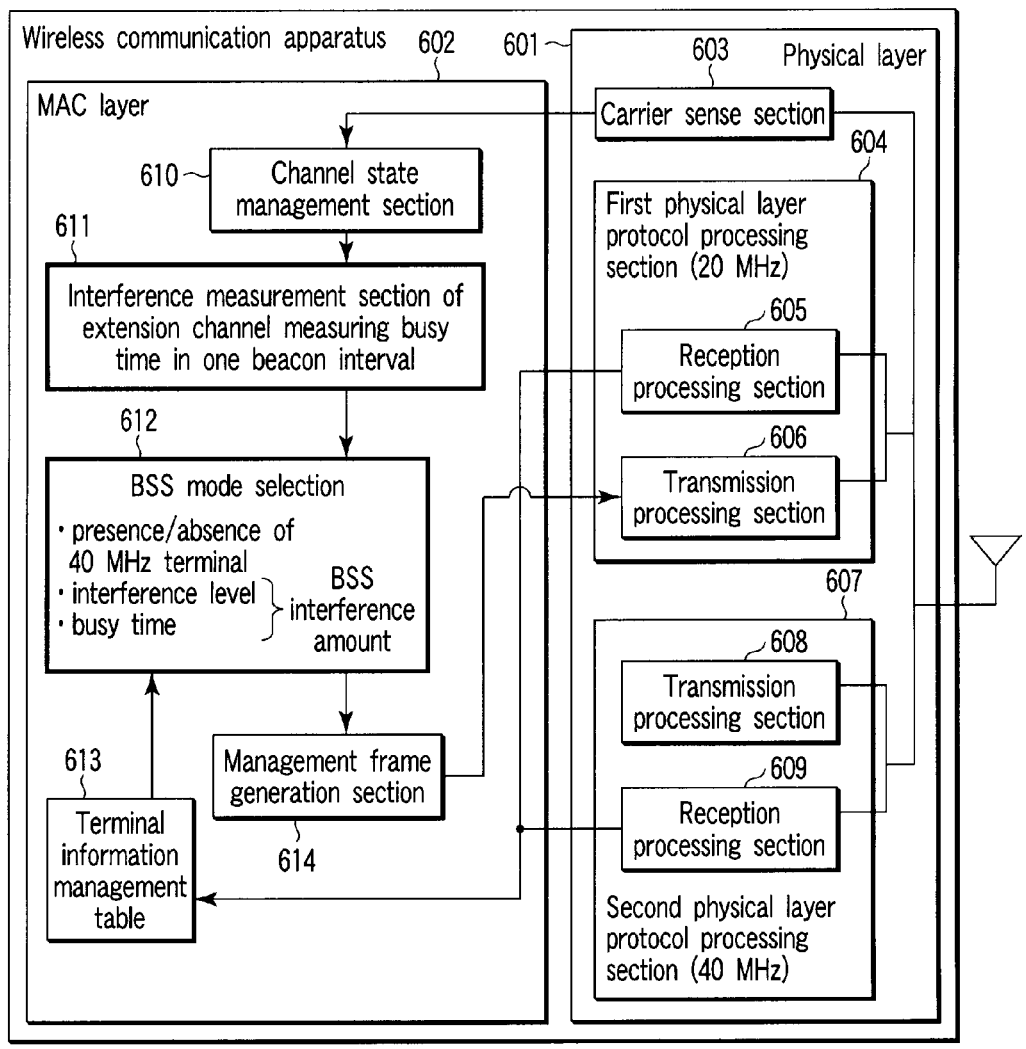
FIG. 6 is a view showing a wireless communication apparatus according to the first embodiment.

FIG. 6 shows an example of a configuration of the wireless communication apparatus according to the embodiment. It is assumed here that the wireless communication apparatus shown in FIG. 6 is a 20/40 MHz AP. This 20/40 MHz AP has a physical layer 601 and a MAC layer 602.

The physical layer 601 includes a first physical layer protocol processing section 604 for executing physical layer protocol processing for performing communication by using the first channel having the first communication bandwidth, a second physical layer protocol processing section 607 for executing physical layer protocol processing for performing communication by using the second channel having the second communication bandwidth wider than the first communication bandwidth, and a carrier sense section 603 for measuring busy/idle information of the channel. The first physical layer protocol processing section 604 includes a reception processing section 605 and a transmission processing section 606. The second physical layer protocol processing section 607 includes a transmission processing section 608 and a reception processing section 609.

The first physical layer protocol processing section 604 and the second physical layer protocol processing section 607 respectively use channels having frequency bandwidths different from each other. In this embodiment, a signal processing section for executing physical layer signal processing for the 20 MHz band communication is the first physical layer protocol processing section 604, and a signal processing section for executing physical layer signal processing for the 40 MHz band communication is the second physical layer protocol processing section 607.

In the first physical layer protocol processing section 604 and the second physical layer protocol processing section 607, circuits are often used in common in the actual mounting, and hence both the sections are not necessarily independent of each other as shown in FIG. 6. Further, of a plurality of first channels each having the first communication bandwidth and executing signal processing in the first physical layer protocol processing section 604, one first channel is regarded as a control channel, another first channel, different from the control channel, is regarded as an extension channel in the following description. The control channel is used to exchange control information used for 20 MHz communication and BSS management, and the extension channel is used as a channel for extending the band at the time of 40 MHz communication.

The protocol processed by the first physical layer protocol processing section 604 includes, at least the physical layer protocol provided in, for example, IEEE 802.11a. In this embodiment, the first communication bandwidth used by the first physical layer protocol processing section 604 is 20 MHz as described previously. The first physical layer protocol processing section 604 may use the so-called multiple input multiple output (MIMO) technique in which a plurality of antennas are used on both the transmission side and the reception side.

The second physical layer protocol processing section 607 may use any one of the single input single output (SISO) technique and the MIMO technique, or both the techniques. The second communication bandwidth used by the second physical layer protocol processing section 607 is 40 MHz as described previously. The first communication bandwidth exists within the second communication bandwidth.

When a signal is received by the reception processing section 605 or the reception processing section 609, the carrier sense section 603 of the physical layer 601 compares the reception signal intensity with a threshold, and determines whether or not (busy or idle) a carrier is detected in the control channel, extension channel, and 40 MHz channel. When the reception signal intensity is higher than the threshold, it is determined that the channel is busy, and when the reception signal intensity is lower than the threshold, it is determined that the channel is idle. In order to avoid an influence of noise of a short period, the reception signal intensity obtained by averaging the reception signal intensity within a certain fixed period may be used. As for the threshold, it may be set by the MAC layer 602 in the carrier sense section 603 of the physical layer 601 in accordance with the situation (state of occurrence of interference or the like in the set environment), or an appropriate one may be selected in accordance with the situation from values set in advance, or a constantly fixed value may be used. The carrier sense section 603 notifies a channel state management section 610 of the MAC layer 602 of the carrier sense result.

In the carrier sense section 603 of the physical layer 601, application of a threshold as will be described below can be performed in addition to the operation described above. The application of a threshold is an operation of, when a reception signal can be regarded as at least a part of the physical header, determining that the signal is a significant signal, applying a threshold used for a significant signal thereto, determining that a reception signal other than the above signal is an insignificant signal, and applying a threshold used for an insignificant signal thereto. This operation is stipulated in, for example, paragraphs such as "CCA", "CCA Sensitivity", and "Receive PLCP" in the IEEE802.11a standard. In many cases, in the carrier sense for a significant signal, the sensitivity (threshold) is set higher than that in the carrier sense for an insignificant signal. For example, in the case of IEEE802.11a, it is stipulated that the sensitivity for a significant signal of the 20 MHz channel should be −82 [dBm], and the sensitivity for an insignificant signal should be −62 [dBm].

However, in order to detect a significant signal in the extension channel, although it is necessary for the wireless communication apparatus to be provided with a function for detecting a physical frame in the extension channel, and be capable of decoding at least a part of the physical header, this function is sometimes omitted from the viewpoint of the apparatus cost and the feasibility. Accordingly, in regard to the carrier sense of the extension channel, detection of the physical header in the reception signal may not be performed, and only measurement of energy in the reception signal may be performed.

In the carrier sense section 603 of the physical layer 601, a 20 MHz filter and a 40 MHz filter are used for signal intensity measurement of the 20 MHz channel and 40 MHz channel, respectively. When signal intensity measurement of the control channel and the extension channel is performed in the 20 MHz channel, one 20 MHz filter may be switched to the control channel or the extension channel to be used. Alternatively, an independent 20 MHz filter may be assigned to each of the control channel and the extension channel. Further, a difference between signal intensities measured by means of the 20 MHz filter and the 40 MHz filter for the control channel may be used as the signal intensity of the extension channel. On the contrary, a sum of a signal intensity obtained for the 20 MHz filter for the control channel, and that obtained for the 20 MHz filter for the extension channel is calculated, and the calculated result may be used as the signal intensity of the 40 MHz channel. Further, in the case of a configuration in which a plurality of antennas are simultaneously used for reception as in the MIMO, a signal is input from each A/D converter to each filter. Reception signal intensities of a plurality of antennas are appropriately added up, and the added result is regarded as the reception signal intensity in each channel. However, in order to reduce the power consumption, the reception signal intensity of only a single antenna may be measured. Incidentally, although it is assumed that a filter is realized by digital processing, it may be realized by analog processing.

The MAC layer 602 comprises the channel state management section 610, an interference measurement section 611 of the extension channel, a BSS mode selection section 612, a terminal information management table 613, and a management frame generation section 614.

The channel state management section 610 manages the carrier sense state on the basis of both a carrier sense result obtained by measurement performed by the carrier sense section 603 of the physical layer 601 and virtual carrier sense information obtained by the protocol of the MAC layer 602, whereby the section 610 determines whether the channel is idle or busy, and notifies the interference measurement section 611 of the extension channel of the determination result. In this embodiment, the channel state management section 610 does not manage the idle/busy state of a single channel but manages the idle/busy state of each of one (control channel) of the two first channels each having the first communication bandwidth and the other (extension channel) of the two first channels. However, as for the idle/busy state of the extension channel, the idle/busy state of the channel may be determined on the basis of only the carrier sense result measured by the carrier sense section 603 without using the virtual carrier sense information obtained by the protocol of the MAC layer 602.

The interference measurement section 611 of the extension channel measures a load amount on the extension channel. Examples of an index for measuring the load amount include an interference signal intensity, duration receiving interference or interference reception frequency, the number of terminals of the other BSS or system using the extension channel, and the like. In this embodiment, the interference signal intensity of the extension channel and the duration receiving interference or interference reception frequency are used as the index. The interference measurement section 611 of the extension channel obtains the interference signal intensity of the extension channel from the carrier sense section 603 of the physical layer 601. At this time, the interference signal intensity of the extension channel may be acquired through the channel state management section 610 of the MAC layer 602.

Further, the interference measurement section 611 of the extension channel measures the duration receiving interference or interference reception frequency on the basis of the idle/busy state of the channel obtained from the channel state management section 610. More specifically, on the basis of the idle/busy state of the extension channel obtained from the channel state management section 610, a length of time in which the state of the extension channel is busy in one beacon interval is stored as statistical information. Alternatively, on the basis of the idle/busy states of the 40 MHz channel and the control channel obtained from the channel state management section 610, a length of time in which each of the 40 MHz channel and the control channel is busy in one beacon interval may be measured, and a difference obtained by subtracting the busy time length of the control channel from the busy time length of the 40 MHz channel may be regarded as the busy time length of the extension channel so as to be stored. Further, when the wireless communication apparatus itself is to transmit a 40 MHz frame, carrier sense of the 40 MHz channel may be performed, the probability that the extension channel is busy may be measured by the carrier sense section 603 of the physical layer 601 as statistical information, and this measured statistical information may be used. The probability that the 40 MHz channel is busy may be measured in place of the probability that the extension channel is busy.

The interference measurement section 611 of the extension channel notifies the BSS mode selection section 612 of the interference signal intensity of the extension channel, and duration receiving interference or interference reception frequency. For example, when requested by the BSS mode selection section 612 to notify of the above information, the interference measurement section 611 of the extension channel notifies the BSS mode selection section 612 of the information.

The BSS mode selection section 612 selects one of the 20 MHz only mode, 20/40 MHz mode, and PCO mode as a BSS operational mode to be applied to the BSS.

FIG. 7 shows a selection algorithm in the BSS mode selection section 612. First, it is checked whether or not a 40 MHz terminal exists in the BSS concerned managed by the wireless terminal apparatus (the 20/40 MHz AP in this case) of FIG. 6 (step S1). For example, in the IEEE802.11 wireless LAN standard, when a station joins the BSS, the station notifies the AP of the abilities of its own terminal apparatuses. Accordingly, the 20/40 MHz AP can retain the abilities of all the terminals as a terminal information management table 613. The 20/40 MHz AP can grasp whether or not a terminal compatible with the 40 MHz band exists by referring to the terminal information management table 613 and checking the abilities of the terminals belonging to the BSS. When no 40 MHz terminal exists in the BSS and only 20 MHz terminals exist therein, the 20 MHz only mode is selected as the BSS operational mode (step S2).

When a 40 MHz terminal exists, the interference signal intensity (interference level) of the extension channel and the duration receiving interference or interference reception frequency (busy time length within one beacon interval) are acquired from the interference measurement section 611 of the extension channel, and are compared with corresponding thresholds (step S3).

As shown in FIG. 7, when the busy time length within one beacon interval is equal to or larger than the threshold Th1, and the interference level is equal to or larger than the threshold Th2, the PCO mode is selected (step S5), and in the case other than the above, the 20/40 MHz mode is selected (step S4).

The above thresholds are not limited to those shown in FIG. 7, settings shown in FIGS. 8 and 9 are allowed. The settings depend on the system design policy, peripheral environment, performance of the wireless communication apparatus, and the like. For example, FIG. 8A shows an example of BSS operational mode selection in which when the interference level exceeds the threshold Th2, the PCO mode is selected irrespective of the busy time length within one beacon interval, and in the case other than the above case, the 20/40 MHz mode is selected. FIG. 8B shows an example of BSS operational mode selection in which when the busy time length within one beacon interval is less than the threshold Th1, and the interference level is lower than the threshold Th2, the 20/40 MHz mode is selected, and in the case other than the above case, the PCO mode is selected. FIG. 8C shows an example of BSS operational mode selection in which when the busy time length within one beacon interval exceeds the threshold Th1, the PCO mode is selected irrespective of the interference level, and in the case other than the above case, the 20/40 MHz mode is selected.

FIG. 8D shows an example in which a region for selecting the PCO mode and a region for selecting the 20/40 MHz mode are separated from each other by a straight line connecting the threshold Th1 for the busy time length within one beacon interval and the threshold Th2 for the interference level. Likewise, FIG. 9A shows an example in which a region for selecting the PCO mode and a region for selecting the 20/40 MHz mode are separated from each other by a curved line connecting the threshold Th1 for the busy time length within one beacon interval and the threshold Th2 for the interference level. FIG. 9B shows an example in which a region for selecting the PCO mode and a region for selecting the 20/40 MHz mode are separated from each other by a curved line prescribed by only one threshold Th.

<Simplified BSS Mode Selection>

Incidentally, the BSS mode selection section 612 may check only whether or not a 40 MHz terminal exists in the BSS without any regard to the interference with the extension channel, and when the 40 MHz terminal exists, may select the PCO mode, and when no 40 MHz terminal exists, may select the 20 MHz only mode.

Specifically, in each BSS mode, the following media access is performed.

<20 MHz Only Mode>

Figure 10:
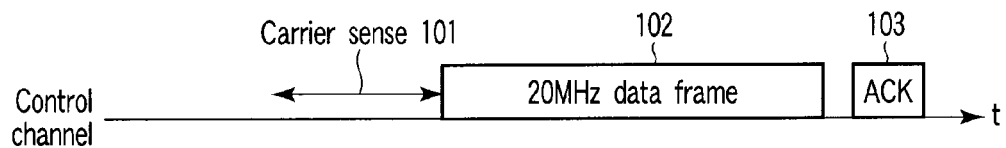
FIG. 10 is a view for explaining media access control in the 20 MHz only mode.

FIG. 10 shows the state of the media access in the 20 MHz only mode. In the BSS in the 20 MHz only mode, only 20 MHz communication is performed on the control channel on the basis of CSMA/CA.

A terminal having a data frame to be transmitted first performs physical carrier sense 101, and detects the busy/idle state of the control channel. When the control channel is in the idle state, if no signal is detected on the control channel for a predetermined period, the data frame 102 of 20 MHz is transmitted. When the control channel is in the busy state at the time of access to the transmission channel, after this busy state is terminated, if no signal is detected on the control channel for a predetermined period, after an elapse of a random period, the data frame 102 is transmitted. When the data frame 102 was successfully received, the destination terminal returns a delivery acknowledgment (ACK) frame 103 to the transmission source terminal after an elapse of a predetermined period from the data frame reception termination time. If collision occurs when the frame transmission is started simultaneously with the other terminal, the destination terminal cannot correctly decode the received data frame in some cases. In such a case, the destination terminal does not return the ACK frame 103. Alternatively, a frame that conveys information the effect that the frame data cannot be received correctly is transmitted.

In the 20 MHz only mode, the frame exchanges described above are all performed by using only the control channel. An example of a system which performs such media access is a wireless LAN such as that of IEEE802.11a/b/g.

Figure 11A:
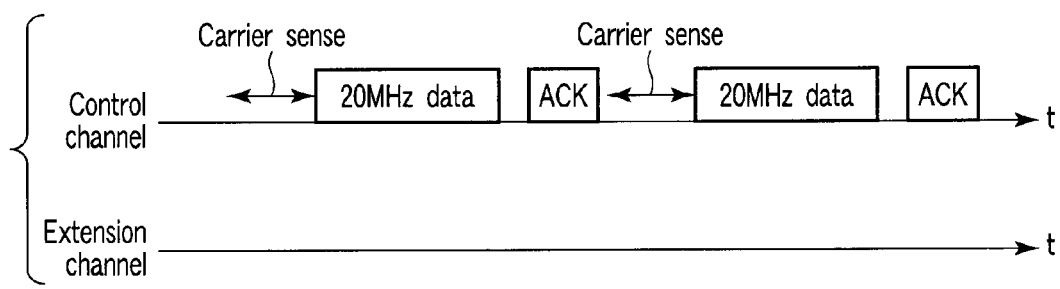
FIGS. 11A and 11B show views for explaining a difference in the load of an extension channel in the 20 MHz only mode.
Figure 11B:
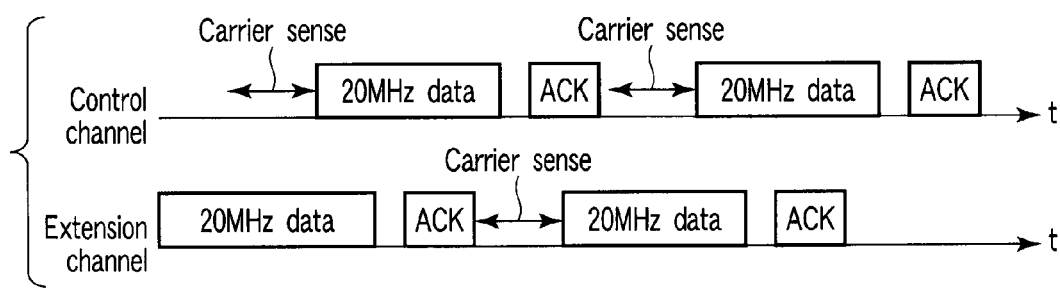

FIG. 11 shows the states of channel access of a case where the extension channel is not used by the other BSS (FIG. 11A), and a case where the extension channel is used by the other BSS (FIG. 11B). The communication of the control channel is not influenced by the presence or absence of the other BSS on the extension channel, and hence the 20 MHz only mode can maintain a constant throughput characteristic irrespective of the state of the extension channel. Therefore, the frame on the control channel and the frame on the extension channel do not collide with each other, and collision of frames of the BSS occurs only on the control channel. Strictly speaking, although there is the possibility of the communication being influenced more or less by the interference of the adjacent channel, it is not mentioned in detail herein.

<20/40 MHz Mode>

Next, the state of the media access of the 20/40 MHz mode is shown in FIG. 12. In the BSS in the 20/40 MHz mode, each terminal performs CSMA/CA similar to the 20 MHz only mode in an autonomous and distributed manner to thereby perform media access. It is permitted to switch communication between a narrow-band (20 MHz) frame using a single channel and a broad-band (40 MHz) frame using plural channels in units of one frame. When a 20 MHz frame is transmitted in the 20/40 MHz mode, the carrier sense 121 of the control channel is performed in the same manner as in the 20 MHz only mode, and if the state is IDLE, the 20 MHz frame 122 is transmitted on the control channel. On the other hand, when a 40 MHz frame is transmitted, the carrier sense 123 is continued until both the control channel and the extension channel enter the IDLE state simultaneously, and when both the channels enter the IDLE state, the 40 MHz frame 124 is transmitted by using both the channels.

FIG. 13 shows the state of another example of the media access in the 20/40 MHz mode. The difference between FIG. 13 and FIG. 12 consists in the carrier sense method at the time of transmitting a 40 MHz frame. In FIG. 12, both the control channel and the extension channel are subjected to the carrier sense, and when both the channels become IDLE, the 40 MHz frame is transmitted. However, in FIG. 13, only the control channel is subjected to the carrier sense 130, and when the control channel becomes IDLE, the 40 MHz frame 131 is transmitted. When the 40 MHz frame is transmitted, any one of the systems of FIGS. 12 and 13 may be used.

FIGS. 14A and 14B show the states of channel access in the case where the extension channel is used by the other BSS in the case of FIG. 12, and in the case where the extension channel is not used by the other BSS. When the extension channel is used by the other BSS, there are few opportunities for both the control channel and the extension channel to be simultaneously set in the IDLE state, and transmission of a 40 MHz frame must wait until both the channels are simultaneously set in the IDLE state. For this reason, the throughput characteristic tends to be deteriorated. Particularly, when the load amount on the extension channel is large, deterioration of the throughput characteristic becomes large.

FIGS. 15A and 15B show the states of channel access in the case where the extension channel is used by the other BSS in the case of FIG. 13, and in the case where the extension channel is not used by the other BSS. In this case, the 40 MHz frame can be transmitted irrespective of the presence or absence of the other BSS using the extension channel. However, at the time of transmitting the 40 MHz frame, if a 20 MHz frame of the other BSS is being transmitted on the extension channel, both the frames collide with each other, and the destination terminal cannot receive the frame normally. Accordingly, if the extension channel is used by the other BSS, the throughput characteristic is deteriorated. Particularly, if the load amount on the extension channel is large, collisions between the 40 MHz frame and the 20 MHz frame of the other BSS on the extension channel frequently occur, and deterioration of the throughput characteristic becomes large.

However, when the BSS and the other BSS on the extension channel are separated from each other by a large distance, the interference reception power of the other BSS adversely affecting the communication in the BSS is small, and even when the 40 MHz frame and the 20 MHz frame of the other BSS on the extension channel collide with each other, the reception terminal can normally decode the frame, whereby the throughput in the BSS is not deteriorated. In such a case, even when the load amount on the extension channel is large, the throughput in the BSS is not adversely affected.

<PCO Mode>

Figure 16:
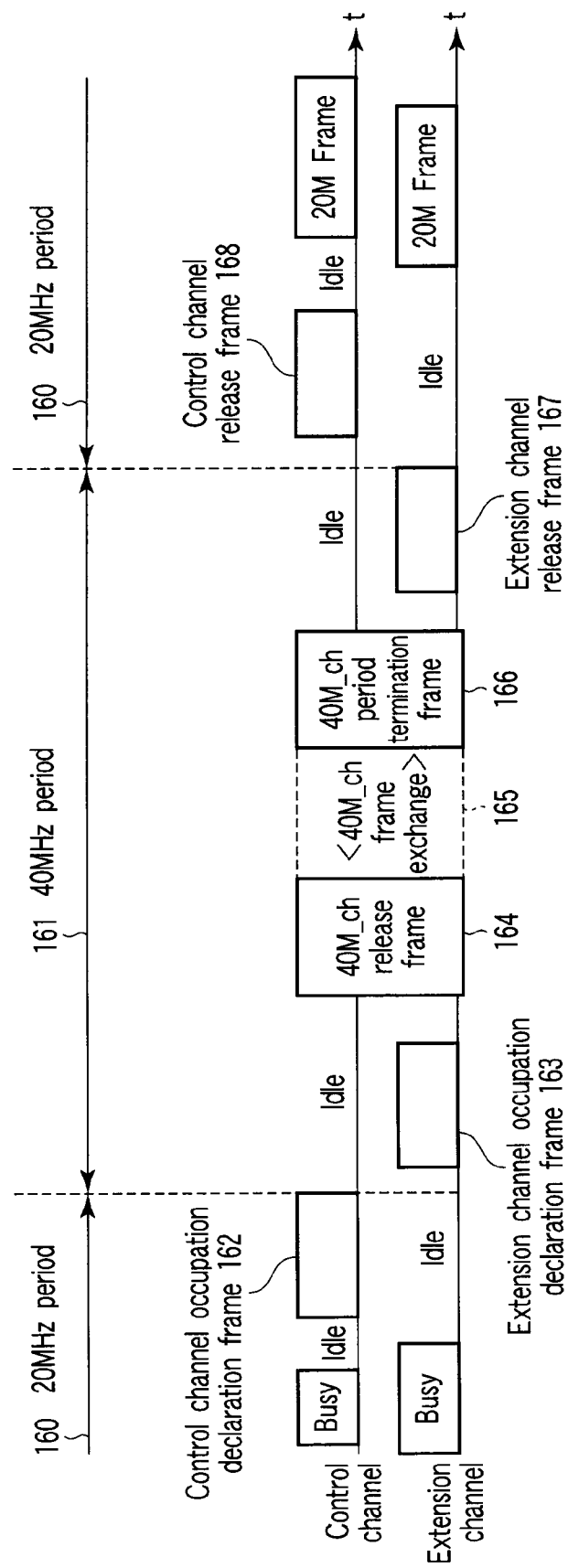
FIG. 16 is a view for explaining media access control in the PCO mode.

Next, FIG. 16 shows the sate of media access in the PCO mode. In the BSS in the PCO mode, the centralized control station reserves a plurality of frequency channels one by one, in sequence, and a period of narrowband communication (20 MHz) using a single channel, and a period of broadband communication (40 MHz) using a plurality of channels, are time-shared. In the example of FIG. 16, the 20/40 NHz AP, which is the centralized control station, instructs the entire BSS to switch between the period (20 MHz period) 160 in which the 20 MHz communication is performed by using the control channel and the period (40 MHz period) 161 in which the 40 MHz communication is performed by using the 40M_ch using both the control channel and the extension channel. In the 20 MHz period 160 and the 40 MHz period 161, a mode (PCF or HCCA) in which the AP polls STA1 and STA2 to perform media access control may be set, or a mode (DCF or EDCA) in which each terminal performs media access control on an equal basis in an autonomous and distributed manner may be set.

FIG. 16 shows the state where the 20 MHz communication is performed in the BSS at first by using the control channel, and the 20 MHz period is resumed with the 40 MHz period interposed between the 20 MHz periods. In the BSS, both the control channel and the 40M_ch are used for communication. In this case, in order to use the 40 MH_ch, the extension channel in which a frequency overlapping with the 40 MH_ch is used is made unavailable to the other mode of communication. Use of the extension channel in the other system or BSS is optional.

At first the 20/40 MHz AP, STA1, and STA2 perform transmission and reception by using the control channel. It is assumed, in this state, that the 20/40 MHz AP is determined to start the procedure of switching the channel to the 40M_ch. The 40M/20 MHz AP performs carrier sense of the control channel, and when an IDLE state continues for a predetermined period, the AP determines that the empty condition of the control channel is satisfied. Thereafter, the AP prepares a frame (hereinafter referred to as a control channel occupation declaration frame) 162 declaring the control channel to be occupied, and transmits the frame by the control channel. At the same time, the control channel occupation declaration frame 162 further notifies that the BSS is switched from the 20 MHz period to the 40 MHz period. Upon receipt of the control channel occupation declaration frame 162, the STA2 is inhibited from transmitting a frame.

Then, the 20/40 MHz AP performs carrier sense of the extension channel, and when an IDLE state continues for a predetermined period, the AP determines that the empty condition of the extension channel is satisfied. Thereafter, the AP prepares a frame (hereinafter referred to as an extension channel occupation declaration frame) 163 declaring the extension channel to be occupied, and transmits the frame by the extension channel. The STA3 receives the extension channel occupation declaration frame 163, and is inhibited from transmitting a frame.

Furthermore, the 20/40 MHz AP transmits a frame (hereinafter referred to as a 40M_ch release frame) 164 notifying that the 40M_ch so far occupied is released. Upon receipt of the 40M_ch release frame 164, the STA1 starts to transmit a 40 MHz frame. Thereafter, media are secured by the normal media access, and 40M_ch frame exchange 165 is performed.

Next, a procedure for switching the BSS from the 40 MHz period to the 20 MHz period will be described below. As shown in FIG. 16, the 20/40 MHz AP may transmit a frame (hereinafter referred to as a 40M_ch period termination frame) 166 clearly notifying of the 40M_ch period termination, or the terminals in the BSS may be notified of the 40 MHz_ch period length in advance by the control channel occupation declaration frame 162 or the extension channel occupation declaration frame 163, and when it enters the 40

MHz_ch period termination expected time, the period may be switched from the 40 MHz period to the 20 MHz period.

Then, the 20/40 MHz AP transmits a frame (hereinafter referred to as an extension channel release frame) 167 notifying that the occupied state of the extension channel is released. Incidentally, the occupation period of the extension channel may be naturally terminated by previously setting the occupation period of the extension channel in such a manner that the occupation period of the extension channel terminates subsequently to the termination of the 40M_ch period. When the STA3 receives the extension channel release frame 167, or when the occupation period of the extension channel terminates naturally, the frame transmission inhibition state is released, and the STA3 can start frame exchange by using the extension channel.

Then, the 20/40 MHz AP transmits a frame (hereinafter referred to as a control channel release frame) 168 notifying that the occupied state of the control channel is released. The occupation period of the control channel may be naturally terminated by previously setting the occupation period of the control channel in such a manner that the occupation period of the control channel terminates subsequently to the termination of the 40M_ch period and the termination of the occupation period of the extension channel. When the STA1 and STA2 receive the control channel release frame 168, or when the occupation period of the control channel naturally terminates, the frame transmission inhibition state is released, and the STA1 and STA2 can start frame exchange by using the control channel.

In the manner described above, the 40 MHz period 161 and the 20 MHz period 160 are alternately repeated at beacon intervals by the control of the AP. Incidentally, in this embodiment, an example in which one beacon interval is time-shared between the 40 MHz period and the 20 MHz period is shown. However, the 40 MHz period and the 20 MHz period may be set irrespective of the beacon cycle, or the period may be switched between the 40 MHz period and the 20 MHz period for a plurality of times within one beacon interval.

FIGS. 17A and 17B show the states of channel access in the case where the extension channel is used by the other BSS, and in the case where the extension channel is not used by the other BSS. In the PCO mode, the 40 MHz period and the 20 MHz period are time-shared, and in the 40 MHz period, transmission of a 20 MHz frame on the extension channel is inhibited. As a result, it is not necessary to wait until the extension channel becomes IDLE at the 40 MHz frame transmission time. Further, there is no collision with the 20 MHz frame on the extension channel, thus the throughput characteristic of the BSS can be kept constant irrespective presence or absence of the other BSS.

However, as described above, there occurs the overhead of switching between the 40 MHz period and the 20 MHz period, and hence when the other BSS is not present on the extension channel, the 20/40 MHz mode is of the higher characteristic. This also applies to a case where the BSS and the other BSS on the extension channel are separated from each other by a large distance, and the interference reception power of the other BSS adversely affecting the communication in the BSS is small. Further, when only 20 MHz STAs or only 40 MHz STAs are present in the BSS, it is not necessary to perform the control of switching between the 40 MHz period and the 20 MHz period performed in the PCO mode.

These three BSS modes are selected as described above. In the environment in which the other system or BSS is present on the extension channel, collisions between the 40 MHz frame in the BSS and the 20 MHz frame on the extension channel occur frequently, and the waiting time until the extension channel becomes idle is long and a 40 MHz frame cannot easily be transmitted, the PCO mode is selected. As a result, high throughput can be achieved irrespective of presence or absence of the other BSS on the extension channel or the load amount. On the other hand, when the other BSS or an interference signal is not present on the extension channel, the interference reception power of the other BSS adversely affecting the communication in the BSS is small, and even if the interference signal is received, the signal does not cause reception deterioration, the 20/40 MHz mode is selected, and higher throughput can be realized than when the other mode is selected as shown in FIG. 1. Accordingly, it is possible to avoid deterioration of the throughput in the BSS caused by selection of an inappropriate BSS operational mode, and construct a high throughput BSS by sufficiently obtaining the band extension effect introduced into IEEE802.11n.

The BSS mode selection section 612 notifies the management frame generation section 614 of the selected BSS operational mode. This notification may be made when the BSS operational mode is changed, or when there is a request from the management frame generation section 614.

The management frame generation section 614 generates a BSS management frame in which the BSS mode selected at the time of, for example, generation of the beacon frame, by the BSS mode selection section 612 is written in the frame header. The generated management frame is handed over to the transmission processing section 606 of the first physical layer protocol processing section 604. The transmission processing section 606 transmits the management frame in a broadcasting manner by using the control channel. As a result, the 20/40 MHz AP notifies the terminals in the BSS of the BSS operational mode. Each of the terminals in the BSS controls the operation of its own wireless communication apparatus in accordance with the BSS operational mode notified from the 20/40 MHz AP.

Incidentally, a part of the constituent elements described above can be realized as a wireless communication program for causing a computer to execute a predetermined procedure. This wireless communication program is stored in a program storage device in the computer. The program storage device is constituted of, for example, a nonvolatile semiconductor storage device, a magnetic disk apparatus, and the like. The above-mentioned wireless communication program is read into a random access memory (RAM) by the control of a CPU (not shown), and is executed by the same CPU.

Second Embodiment

In the first embodiment, an example in which the load amount on the extension channel is measured by using the interference signal intensity of the extension channel and the duration receiving interference or the interference reception frequency has been described. However, in this embodiment, an example in which the number of terminals of the other BSS existing on an extension channel is used as a load amount will be described below.

The system configuration, channel arrangement, and media access system which have been described in the first embodiment and shown in FIGS. 3 to 5 also apply to this embodiment.

Figure 18:
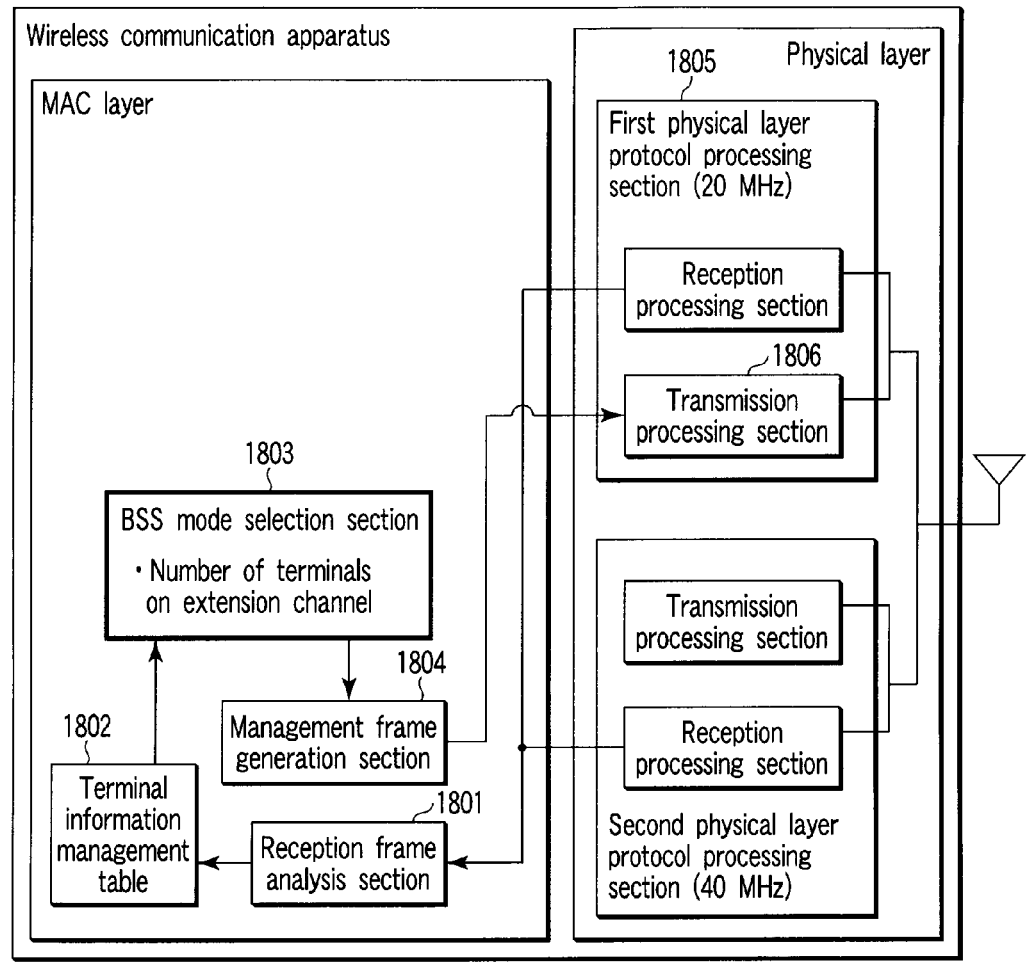
FIG. 18 is a view showing a wireless communication apparatus according to a second embodiment.

FIG. 18 shows the configuration of a wireless communication apparatus according to this embodiment. Unlike the first embodiment, a carrier sense section, channel state management section, and interference measurement section of the extension channel are not shown in FIG. 18. However, the wireless communication apparatus according to this embodiment may be, or may not be provided with these functional sections.

In the wireless communication apparatus (20/40 MHz AP in this case) shown in FIG. 18, a 20 MHz frame received on the extension channel is analyzed in a reception frame analysis section 1801, and information on the number of terminals of the other BSS is acquired. The number of terminals belonging to this BSS might be described in the BSS management frame such as a beacon frame of the other BSS, or the terminal number information might be included in the header of the data frame. Further, even if the terminal number information is not described in the received frame, a method is conceivable by which the number of terminals in the other BSS can be roughly grasped by obtaining the transmission source address, destination address, and the like.

The number of terminals in the other BSS acquired from the received frame is handed over to a terminal information management table 1802 so as to be stored. The 20/40 MHz AP acquires the number of terminals in the other BSS at the time of selection of the BSS operational mode from a BSS mode selection section 1803 by referring to the terminal information management table 1802.

Figure 19:
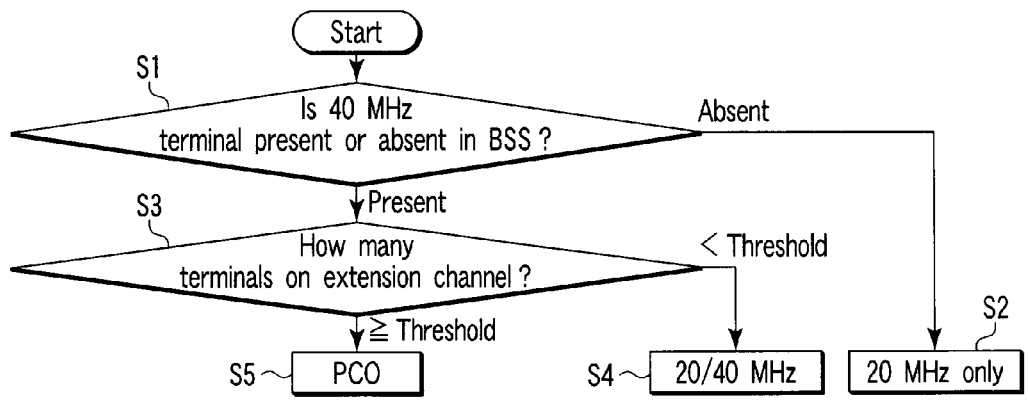
FIG. 19 is a flowchart showing a selection algorithm in a BSS mode selection section according to the second embodiment.

The BSS mode selection section 1803 selects one of a 20 MHz only mode, 20/40 MHz mode, and PCO mode as a BSS operational mode to be applied to the BSS. FIG. 19 shows a selection algorithm in the BSS mode selection section according to this embodiment. First, it is checked whether or not a 40 MHz terminal exists in the BSS managed by the wireless terminal apparatus (20/40 MHz AP in this case) shown in FIG. 18 (step S1). For example, in an IEEE802.11 wireless LAN, when a station joins the BSS, the station notifies the AP of the abilities of its own terminal apparatuses. Accordingly, the 20/40 MHz AP can retain the abilities of all the terminals as a terminal information management table 1802. The 20/40 MHz AP can grasp whether or not a terminal compatible with the 40 MHz band exists by referring to the terminal information management table 1802 and checking the abilities of the terminals belonging to the BSS. When no 40 MHz terminal exists in the BSS and only 20 MHz terminals exist therein, the 20 MHz only mode is selected as the BSS operational mode (step S2).

When a 40 MHz terminal exists, the number of terminals in the other BSS on the extension channel is acquired by referring to the terminal information management table 1802, and when the terminal number is equal to or larger than a predetermined threshold, the PCO mode is selected (step S3), and in the case other than the above, the 20/40 MHz mode is selected (step S4). As described above, by checking the number of terminals in the other BSS, the load amount on the extension channel can be estimated. When the number of terminals of the other BSS is large, even if the traffic volume of one terminal is small, a large number of terminals mutually transmit frames, and hence the load amount on the extension channel is considered to be large. On the other hand, when the number of terminals in the other BSS is small, the load amount on the extension channel is considered to be relatively small, although the load amount depends on the traffic volume of one terminal.

Accordingly, the BSS operational mode is selected on the basis of the number of terminals of the other BSS. When the other system or the other BSS is present on the extension channel, and the load amount thereof is large, the PCO mode is selected. When the other BSS or an interference signal is not present on the extension channel, or when the load amount on the extension channel is small, the 20/40 MHz mode is selected. As a result, the same effect as in the first embodiment can be obtained.

The BSS mode selection section 1803 notifies a management frame generation section 1804 of the selected BSS operational mode. This notification may be made when the BSS operational mode is changed, or when there is a request from the management frame generation section 1804.

The management frame generation section 1804 generates a BSS management frame in which the BSS mode selected at the time of, for example, generation of the beacon frame, by the BSS mode selection section 1803 is written in the frame header. The generated management frame is handed over to a transmission processing section 1806 of a first physical layer protocol processing section 1805. The transmission processing section 1806 transmits the management frame in a broadcasting manner by using the control channel. As a result, the 20/40 MHz AP notifies the terminals in the BSS of the BSS operational mode. Each of the terminals in the BSS controls the operation of its own wireless communication apparatus in accordance with the BSS operational mode notified from the 20/40 MHz AP.

Third Embodiment

In each of the first and second embodiments, the case where the BSS operational mode is selected on the basis of the load amount on the extension channel has been described. In this embodiment, a case where a BSS operational mode is selected on the basis of types of terminals and the number of terminals in the BSS will be described below. The system configuration, channel arrangement, and media access system which have been described in the first embodiment and shown in FIGS. 3 to 5 also apply to this embodiment.

Figure 20:
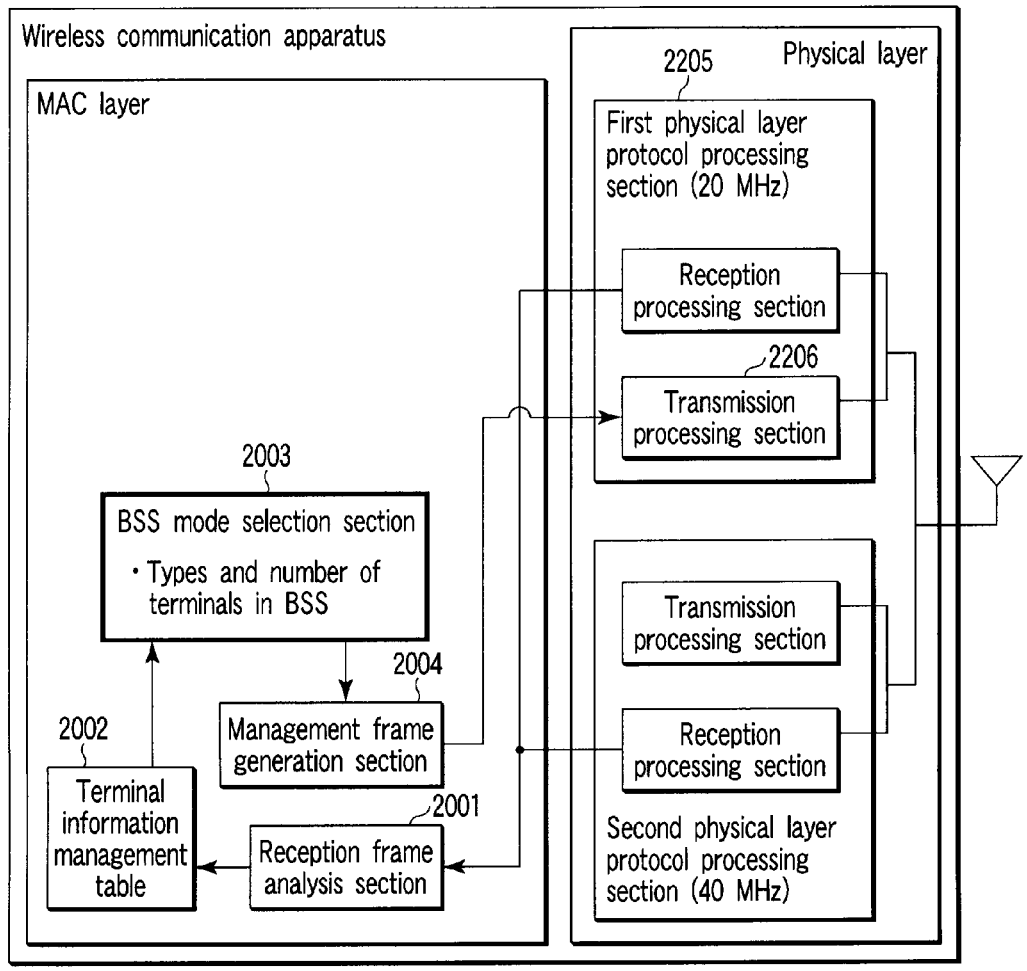
FIG. 20 is a view showing a wireless communication apparatus according to a third embodiment.

FIG. 20 shows the configuration of a wireless communication apparatus according to this embodiment. Unlike the first embodiment, a carrier sense section, channel state management section, and interference measurement section of the extension channel are not shown in FIG. 20. However, the wireless communication apparatus according to this embodiment may be, or may not be provided with these functional sections.

In the wireless communication apparatus (20/40 MHz AP in this case) shown in FIG. 20, a 20 MHz frame received on the extension channel is analyzed in a reception frame analysis section 2001, and terminal information described in the frame header is acquired.

In the IEEE802.11 wireless LAN, when a station joins the BSS, the station describes the abilities of its own terminal apparatuses in the frame header so as to notify the AP of the abilities of its own terminal apparatuses. As the abilities of the station's own terminal apparatuses, for example, a supported bandwidth (20 MHz or 40 MHz), whether or not the PCO mode is supported, the number of antennas, and the like can be enumerated. The 20/40 MHz AP writes the ability information on the terminals acquired in the reception frame analysis section 2001 to a terminal information management table 2002. Therefore, in the terminal information management table 2002 of the 20/40 MHz AP, the ability information on the terminals in the BSS is collected and stored. The 20/40 MHz AP refers to this terminal information management table 2002 so as to check the abilities of the terminals belonging to the BSS as the need arises, i.e., at the time of selection of the BSS operational mode in this case.

Figure 21:
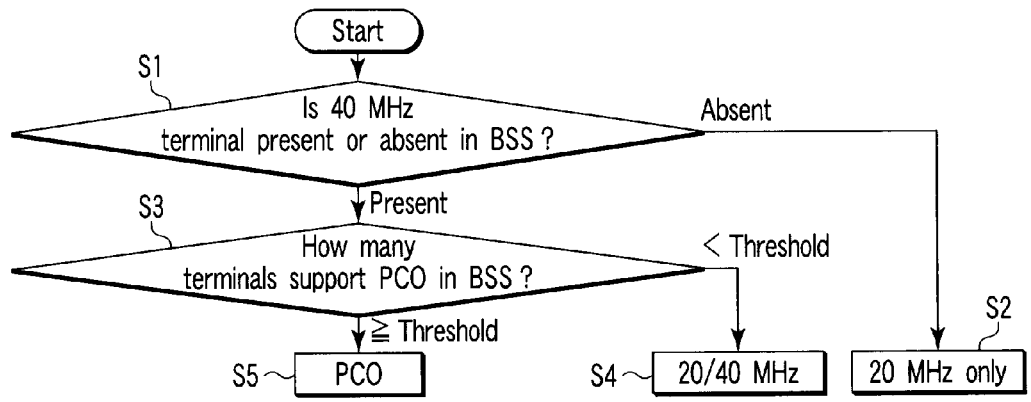
FIG. 21 is a flowchart showing a selection algorithm in a BSS mode selection section according to the third embodiment.

A BSS mode selection section 2003 selects one of the 20 MHz only mode, 20/40 MHz mode, and PCO mode as a BSS operational mode to be applied to the BSS. FIG. 21 shows a selection algorithm in the BSS mode selection section 2003 according to this embodiment. First, it is checked whether or not a 40 MHz terminal exists in the BSS managed by the wireless terminal apparatus (20/40 MHz AP in this case) shown in FIG. 20 by referring to the terminal information management table 2002 (step S1). When no 40 MHz terminal exists in the BSS and only 20 MHz terminals exist therein, the 20 MHz only mode is selected as the BSS operational mode (step S2).

When a 40 MHz terminal exists, the number of terminals supporting the PCO mode is acquired by referring to the terminal information management table 2002 again. When this terminal number is equal to or larger than a threshold, the PCO mode is selected (step S3), and in the case other than the above, the 20/40 MHz mode is selected (step S4).

The BSS mode selection section 2003 notifies a management frame generation section 2004 of the selected BSS operational mode. This notification may be made when the BSS operational mode is changed, or when there is a request from the management frame generation section 2004.

The management frame generation section 2004 generates a BSS management frame in which the BSS mode selected at the time of, for example, generation of the beacon frame, by the BSS mode selection section 2003 is written in the frame header. The generated management frame is handed over to the transmission processing section 2006 of the first physical layer protocol processing section 2005. The transmission processing section 2006 transmits the management frame in a broadcasting manner by using the control channel. As a result, the 20/40 MHz AP notifies the terminals in the BSS of the BSS operational mode. Each of the terminals in the BSS controls the operation of its own wireless communication apparatus in accordance with the BSS operational mode notified from the 20/40 MHz AP.

As described above, in this embodiment, erroneous selection in which although no terminal supporting the PCO mode exists in the BSS, the PCO mode is selected can be avoided by selecting the BSS operational mode on the basis of the types and the number of terminals in the BSS.

Fourth Embodiment

In this embodiment, a case where the BSS operational mode is selected on the basis of the throughput in the BSS will be described below. The system configuration, channel arrangement, and media access system which have been described in the first embodiment and shown in FIGS. 3 to 5 also apply to this embodiment.

Figure 22:
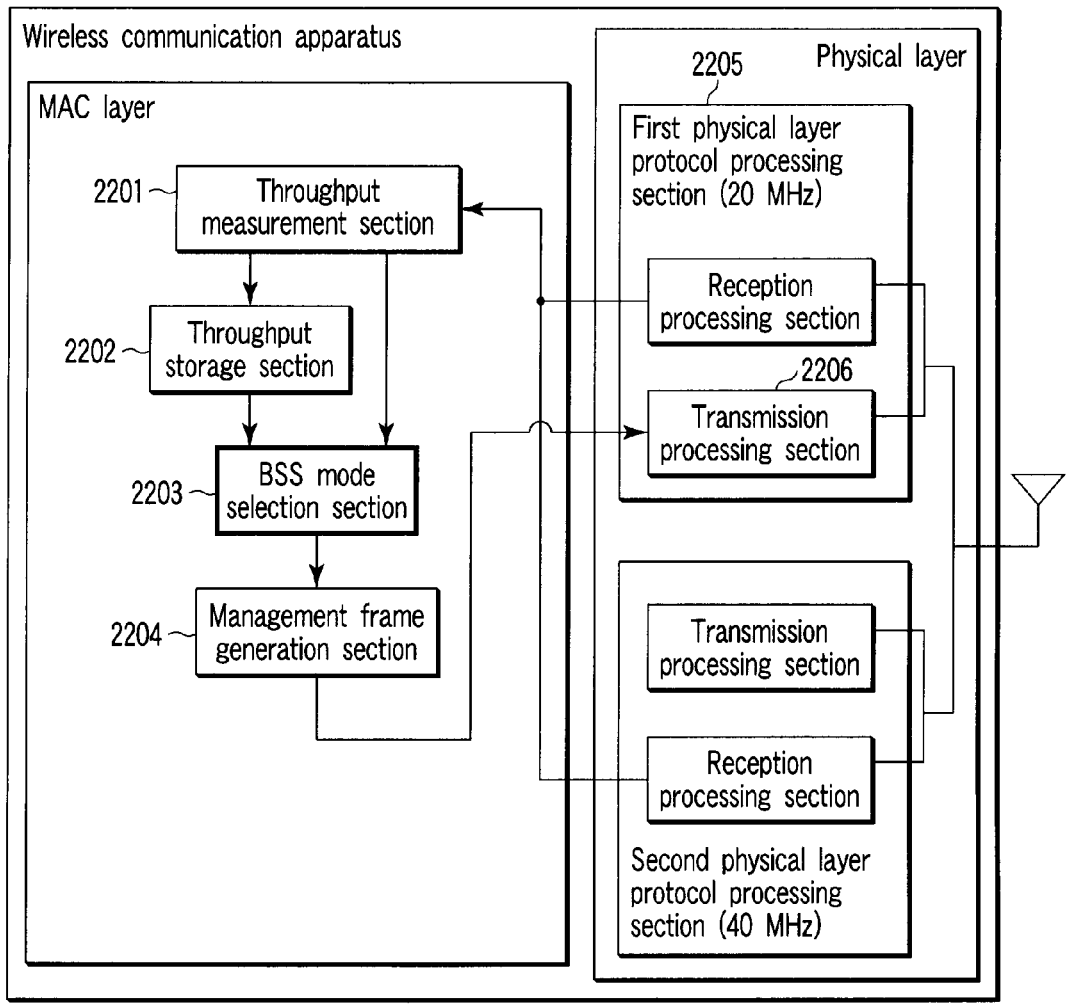
FIG. 22 is a view showing a wireless communication apparatus according to a fourth embodiment.

FIG. 22 shows a wireless communication apparatus according to this embodiment. In the wireless communication apparatus (20/40 MHz AP in this case) shown in FIG. 22, the throughput in the BSS is measured in a throughput measurement section 2201. As a method of measuring the throughput in the BSS, a method is conceivable in which a delivery acknowledgment response frame in return for the data frame transmitted from the 20/40 MHz AP is checked, and approximate throughput is grasped from the number and frame lengths of frames received correctly. Further, there is also a method of measuring the throughput, in which the throughput is grasped from an error rate of data frames received by the 20/40 MHz AP, the number of frames which can be received correctly, and frame lengths. Not only are the frames received by the 20/40 MHz AP itself checked, but also communications between other terminals may be observed, thereby measuring the throughput. Furthermore, throughput is measured in each terminal in the BSS, and measurement results are notified to the 20/40 MHz AP, whereby the 20/40 MHz AP may grasp the throughput in the BSS. The throughput measured in the throughput measurement section 2201 is written to a throughput storage section 2202 so as to be stored.

Figure 23:
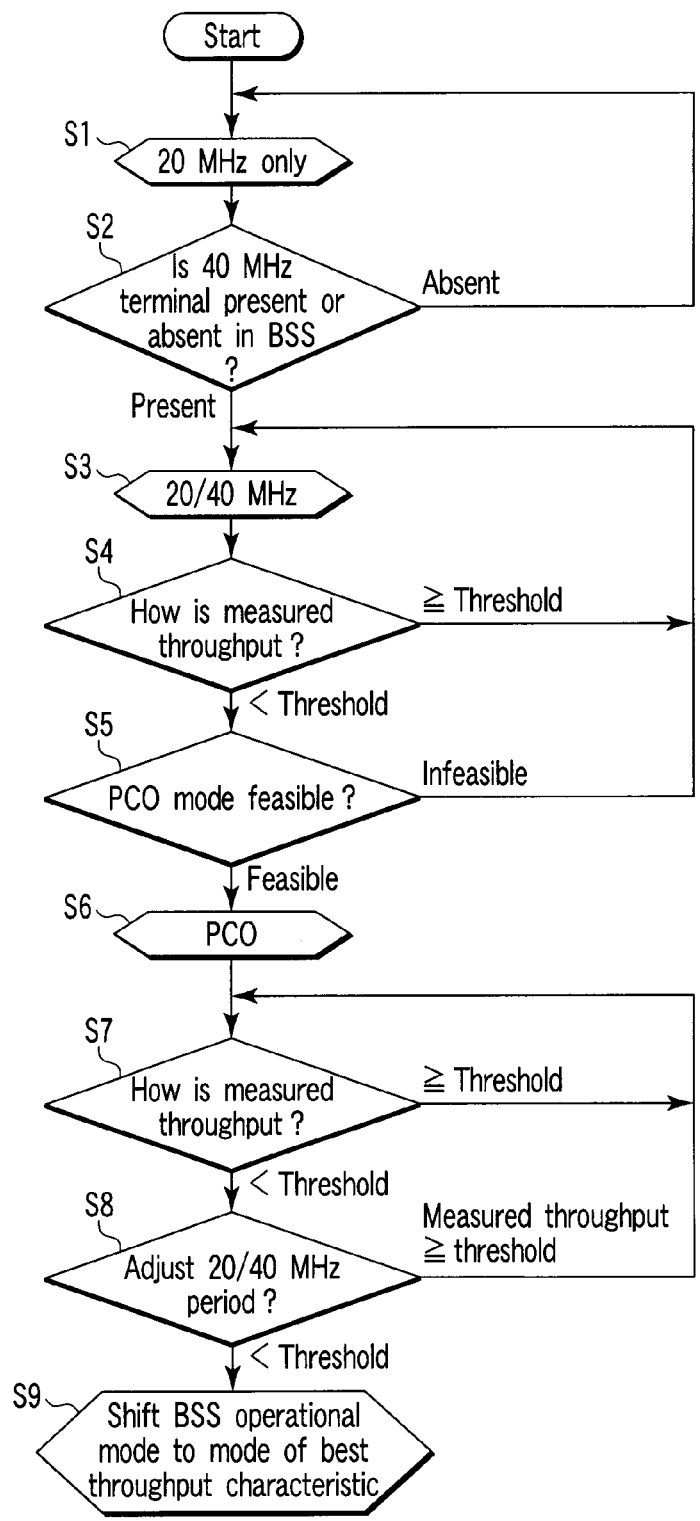
FIG. 23 is a flowchart showing a selection algorithm in a BSS mode selection section according to the fourth embodiment.

A BSS mode selection section 2203 selects one of the 20 MHz only mode, 20/40 MHz mode, and PCO mode on the basis of the measured throughput in the BSS as the BSS operational mode to be applied to the BSS. FIG. 23 shows a selection algorithm in the BSS mode selection section 2203 according to this embodiment. First, at the point of time of the start of BSS operational mode selection, the 20 MHz only mode is made the candidate of the BSS operational mode (step S1). Then, it is checked whether or not a 40 MHz terminal exists in the BSS managed by the wireless terminal apparatus (20/40 MHz AP in this case) shown in FIG. 22 (step S2). When no 40 MHz terminal exists in the BSS and only 20 MHz terminals exist therein, the 20 MHz only mode is selected as the BSS operational mode.

When a 40 MHz terminal exists, the 20/40 MHz mode is selected as the candidate (step S3), and the throughput in the BSS in the 20/40 MHz mode is measured. The BSS mode selection section 2203 acquires the measured throughput directly from the throughput measurement section 2201 or acquires the throughput stored at the time of the 20/40 MHz mode by referring to the throughput storage section 2202, and compares the throughput with a predetermined threshold (step S4). As the threshold, for example, a target throughput desired to be achieved in the BSS and throughput required in the BSS in accordance with a traffic volume of each terminal may be set.

When the throughput at the time of the 20/40 MHz mode is equal to or larger than the threshold, the 20/40 MHz mode is selected as the BSS operational mode. When the throughput at the time of the 20/40 MHz mode is smaller than the threshold, it is further checked whether or not terminals in the BSS support the PCO mode (step S5). When it is determined that the number of terminals supporting the PCO mode is large and the PCO mode is feasible, the mode is shifted to the PCO mode (step S6). When it is determined that the PCO mode is infeasible for the reason that there exists no terminal supporting the PCO mode in the BSS, or the like, the 20/40 MHz mode is selected as it is.

The throughput in the BSS is measured in the PCO mode, and when this throughput is equal to or larger than the threshold (step S7), the PCO mode is selected as the BSS operational mode. When the throughput is smaller than the threshold, there is the possibility of the setting of the 20/40 MHz period length of the PCO mode being inappropriate, and hence the 20/40 MHz period length is adjusted (step S8). For example, the ratio of the 20 MHz period length to the 40 MHz period length is changed to 9:1, 8:2, 7:3, 6:4, 5:5, 4:6, 3:7, 2:8, and 1:9 in one beacon interval, and a ratio that makes the throughput of the entire 20/40 MHz period equal to or larger than the threshold is set. When the throughput is smaller than the threshold even by setting the 20/40 MHz period length at any of the 20/40 MHz ratios, the BSS operational mode is shifted, by referring to the throughput storage section 2202, to a BSS operational mode recorded as the highest throughput mode (step S9).

In the BSS mode selection section 2203, the BSS operational mode selection algorithm shown in FIG. 23 may be executed periodically, or may be executed when some change takes place in the BSS. For example, entry of a new terminal, withdrawal of a terminal belonging to the BSS, an increase or decrease in the number of terminals, a change in the channel number used in the BSS, and the like can be considered as the trigger of execution. Furthermore, the throughput may be continuously measured, and when the throughput becomes lower than the threshold, by using this fact as the trigger, the BSS operational mode may be shifted to the next BS operational mode in accordance with the flow shown in FIG. 23.

The BSS mode selection section 2203 notifies a management frame generation section 2204 of the selected BSS operational mode. This notification may be made when the BSS operational mode is changed, or when there is a request from the management frame generation section 2204.

The management frame generation section 2204 generates a BSS management frame in which the BSS mode selected at the time of, for example, generation of the beacon frame, by the BSS mode selection section 2203 is written in the frame header. The generated management frame is handed over to a transmission processing section 2206 of a first physical layer protocol processing section 2205. The transmission processing section 2206 transmits the management frame in a broadcasting manner by using the control channel. As a result, the 20/40 MHz AP notifies the terminals in the BSS of the BSS operational mode. Each of the terminals in the BSS controls the operation of its own wireless communication apparatus in accordance with the BSS operational mode notified from the 20/40 MHz AP.

According to this embodiment, even when it is difficult to measure a load volume of the extension channel as in the first and second embodiments, the BSS mode can be selected in such a manner that the best throughput characteristic can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus in which a first wireless communication using one first channel of two first channels each having a first bandwidth, and a second wireless communication using a second channel having a second bandwidth wider than the first bandwidth and having a band overlapping those of the two first channels are performed, comprising:
   a selection unit configured to select a Basic Service Set (BSS) operational mode for a BSS on the basis of a load amount of the other first channel of the two first channels;
   a generation unit configured to generate a management frame indicating the BSS operational mode selected by the BSS mode selection unit;
   a transmission unit configured to transmit the management frame;
   a carrier sense unit configured to determine idle/busy information of the other first channel or the second channel; and
   a load amount measurement unit configured to measure a load amount of the other first channel or the second channel on the basis of the idle/busy information, wherein
   the selection unit selects, as the BSS operational mode, one of the BSS modes that is a first BSS mode in which a frame is transmitted by the first wireless communication, a second BSS mode in which a centralized control station alternately switches between a first communication period for performing the first wireless communication and a second communication period for performing the second wireless communication, or a third BSS mode in which a frame is transmitted by either the first wireless communication or the second wireless communication.

2. The apparatus according to claim 1, wherein
the load amount measurement unit includes a first measurement unit configured to measure an interference signal intensity on the other first channel, and a second measurement unit configured to measure an duration receiving interference or interference reception frequency on the other first channel or the second channel on the basis of the idle/busy information, and
the selection unit selects the BSS operational mode on the basis of at least one of the interference signal intensity, the duration receiving interference or the interference reception frequency, and the types of terminals existing in the BSS.

3. The apparatus according to claim 1, wherein
the load amount measurement unit acquires information on the number of terminals of an other BSS from a received frame, and
the selection unit selects the BSS operational mode on the basis of one of or both the information on the number of terminals of the other BSS and the types of terminals existing in the BSS.

4. The apparatus according to claim 1, wherein
the selection unit selects the first BSS mode when only terminals for performing the first wireless communication exist in the BSS, and selects the second BSS mode when at least one terminal supporting the second BSS mode exists in the BSS.

5. The apparatus according to claim 1, wherein
the load amount measurement unit includes a first measurement unit configured to measure an interference signal intensity on the other first channel, and a second measurement unit configured to measure duration receiving interference or interference reception frequency on the other first channel or the second channel on the basis of the idle/busy information, and
the selection unit:
   selects the first BSS mode when only terminals for performing the first wireless communication exist in the BSS;
   compares the duration receiving interference or the interference reception frequency and the interference signal intensity with thresholds when at least one terminal for performing the second wireless communication exists in the BSS;
   selects the second BSS mode when the duration receiving interference or the interference reception frequency and the interference signal intensity are larger than predetermined thresholds; and
   selects the third BSS mode when the duration receiving interference or the interference reception frequency or the interference signal intensity is smaller than the threshold.

6. The apparatus according to claim 1, wherein
the load amount measurement unit acquires information on the number of terminals of an other BSS on the basis of a received frame, and
the selection unit:
   selects the first BSS mode when only terminals for performing the first wireless communication exist in the BSS;
   further compares the information on the number of terminals of the other BSS acquired by the load amount measurement unit with a predetermined threshold when at least one terminal for performing the second wireless communication exists in the BSS;

selects the second BSS mode when the information on the number of terminals of the other BSS is larger than the threshold; and selects the third BSS mode when the information on the number of terminals of the other BSS is smaller than the threshold.

7. A wireless communication apparatus in which a first wireless communication using one first channel of two first channels each having a first bandwidth, and a second wireless communication using a second channel having a second bandwidth wider than the first bandwidth and having a band overlapping those of the two first channels are performed, comprising:

a selection unit configured to select a Basic Service Set (BSS) operational mode for a BSS on the basis of a load amount of the other first channel of the two first channels;

a generation unit configured to generate a management frame indicating the BSS operational mode selected by the BSS mode selection unit;

a transmission unit configured to transmit the management frame;

a throughput measurement unit configured to measure throughput in the BSS, wherein the selection unit compares the throughput measured by the throughput measurement unit with a threshold function or throughput measured in the past, and selects the BSS operational mode on the basis of one of or both the comparison result and the types of terminals existing in the BSS.

8. The apparatus according to claim 7, wherein the selection unit:

selects a first BSS mode in which a frame is transmitted by the first wireless communication when terminals for performing only the first wireless communication exist in the BSS;

further compares the throughput measured by the throughput measurement unit with a predetermined threshold or the throughput measured in the past when terminals for performing the second wireless communication exist in the BSS;

selects a second BSS mode in which a centralized control station alternately switches the period from/to a first communication period in which the first wireless communication is performed to/from a second communication period in which the second wireless communication is performed when the measured throughput is larger than the threshold or the throughput measured in the past; and selects a third BSS mode in which a frame is transmitted by one of the first wireless communication and the second wireless communication when the throughput measured by the throughput measurement unit is smaller than the threshold or the throughput measured in the past.

9. A wireless communication apparatus in which a first wireless communication using one first channel of two first channels each having a first bandwidth, and a second wireless communication using a second channel having a second bandwidth wider than the first bandwidth and having a band overlapping those of the two first channels are performed, comprising:

a selection unit configured to select a Basic Service Set (BSS) operational mode for a BSS on the basis of a load amount of the other first channel of the two first channels;

a generation unit configured to generate a management frame indicating the BSS operational mode selected by the BSS mode selection unit;

a transmission unit configured to transmit the management frame;

a frame analysis unit configured to acquire terminal information indicating an ability of an other terminal by analyzing a received frame; and a terminal information storage unit configured to store the terminal information, wherein the selection unit refers to the terminal information storage unit, and selects the BSS operational mode on the basis of one of or both the types of terminals existing on the other first channel and the number of terminals.

10. The apparatus according to claim 9, wherein the selection unit:

selects a first BSS mode in which a frame is transmitted by the first wireless communication when only terminals for performing the first wireless communication exist in the BSS;

refers to the terminal information storage unit when terminals for performing the second wireless communication exist in the BSS;

selects a second BSS mode in which a centralized control station alternately switches the period from/to a first communication period in which the first wireless communication is performed to/from a second communication period in which the second wireless communication is performed when the number of terminals supporting the second BSS mode is larger than a predetermined threshold, and selects a third BSS mode in which a frame is transmitted by one of the first wireless communication and the second wireless communication when the number of terminals supporting the second BSS mode is smaller than the threshold.

* * * * *